(12) United States Patent
Tsujii et al.

(10) Patent No.: US 7,381,788 B2
(45) Date of Patent: Jun. 3, 2008

(54) METHOD FOR CONTINUOUS PRODUCTION OF POLYAMIDE

(75) Inventors: Yasuhito Tsujii, Fukui (JP); Gaku Maruyama, Fukui (JP); Kaoru Ogawa, Osaka (JP); Yoshinori Takada, Fukui (JP); Kazuhisa Koishi, Fukui (JP); Kenta Susuki, Fuki (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/525,740

(22) PCT Filed: Aug. 27, 2003

(86) PCT No.: PCT/JP03/10890

§ 371 (c)(1),
(2), (4) Date: Oct. 11, 2005

(87) PCT Pub. No.: WO2004/024795

PCT Pub. Date: Mar. 25, 2004

(65) Prior Publication Data

US 2006/0122360 A1    Jun. 8, 2006

(30) Foreign Application Priority Data

Aug. 30, 2002   (JP) ............... 2002-253222
Aug. 30, 2002   (JP) ............... 2002-253223
Dec. 25, 2002   (JP) ............... 2002-374208

(51) Int. Cl.
C08G 69/00      (2006.01)
C08G 69/28      (2006.01)
B29C 47/76      (2006.01)

(52) U.S. Cl. .......... 528/310; 264/101; 264/165; 264/169; 264/170; 422/131; 422/135; 528/323; 528/324; 528/329.1; 528/331; 528/332; 528/335; 528/339; 528/340; 528/480; 528/485; 525/486; 525/491; 525/492; 525/501

(58) Field of Classification Search .......... 528/310, 528/322, 332, 335–336, 323, 324, 329.1, 528/331, 339, 340, 480, 485, 486, 491, 492, 528/501; 264/101, 165, 169, 170; 422/131, 422/135

See application file for complete search history.

(56) References Cited

U.S. PATENT DOCUMENTS 6,201,096 B1 *   3/2001   Marchildon et al. ........ 528/310
6,316,588 B1 *  11/2001   Mohrschladt et al. ....... 528/310
6,489,435 B2 * 12/2002   Tanaka et al. ............... 528/310

FOREIGN PATENT DOCUMENTS

| EP | 0 291 096 A2 | 11/1988 |
|---|---|---|
| EP | 1 118 630 A2 | 7/2001 |
| EP | 1 223 186 A1 | 7/2002 |
| JP | 59-155426 A | 9/1984 |
| JP | 60-206828 A | 10/1985 |
| JP | 62-156130 A | 7/1987 |
| JP | 2-187427 A | 7/1990 |
| JP | 8-170895 A | 7/1996 |
| JP | 10-509760 T | 9/1998 |
| JP | 2000-204154 A | 7/2000 |
| JP | 2000-204155 A | 7/2000 |
| JP | 2001-200052 A | 7/2001 |
| JP | 2002-516365 | 6/2002 |
| JP | 2002-516366 T | 6/2002 |
| JP | 2002-194079 | 7/2002 |
| JP | 2003-002966 A | 1/2003 |
| JP | 2003 002967 * | 1/2003 |
| JP | 2003-2967 | 1/2003 |
| JP | 2003-002967 A | 1/2003 |
| JP | 2003-165838 A | 6/2003 |
| JP | 2003-252986 A | 9/2003 |
| WO | WO 96-16107 | 5/1996 |
| WO | WO 99/61510 | 12/1999 |
| WO | WO 99/61511 | 12/1999 |

* cited by examiner

*Primary Examiner*—Ana L Woodward
(74) *Attorney, Agent, or Firm*—Westerman, Hattori, Daniels & Adrian, LLP.

(57) ABSTRACT

Provided is a continuous production method of a polyamide with stabilized polymerization degree and good quality, particularly an aromatic-containing polyamide. A continuous production method of a polyamide, comprising (a) a raw material preparation step of individually melting a diamine and a dicarboxylic acid, or producing a salt of amine and carboxylic acid in water, (b) a raw material introduction step of continuously introducing the prepared raw materials into a tubular reaction apparatus, (c) an amidation step of passing the introduced raw materials through the tubular reaction apparatus, thereby effecting amidation to obtain a reaction mixture containing an amidated product and a condensed water, (d) an initial polymerization step of introducing the reaction mixture into a continuous reaction apparatus capable of separation and removal of water, and elevating the polymerization degree while separating and removing water at a temperature higher than the melting point of the finally obtained polyamide to obtain a polyamide prepolymer, and (e) a final polymerization step of introducing the polyamide prepolymer into a continuous reaction apparatus capable of separation and removal of water, and further elevating the polymerization degree at a temperature higher than the melting point of the finally obtained polyamide to obtain a polyamide adjusted to a desired relative viscosity [RV].

29 Claims, 2 Drawing Sheets

METHOD FOR CONTINUOUS PRODUCTION OF POLYAMIDE

TECHNICAL FIELD

The present invention relates to a continuous production method of a polyamide with good quality and stable polymerization degree. The continuous production method of the present invention can be applied to either an aliphatic polyamide or an aromatic-containing polyamide but is preferably applied to an aromatic-containing polyamide of which production is in more difficult conditions.

Polyamides having an aromatic ring are excellent in the mechanical strength and dimensional stability and can be preferably used for film, sheet, packaging bag, bottle, engineering plastic, fiber and the like.

BACKGROUND ART

The polyamide resin is being widely used for usage such as film, sheet, packaging bag, engineering plastic and fiber, because of its excellent physical and mechanical properties.

In such usage, aliphatic polyamides such as nylon 6 and nylon 66 have been heretofore predominantly used. However, the aliphatic polyamide in general has drawbacks that a large dimensional change occurs between the water absorption moisture absorption time and the drying time and since this is aliphatic, the elastic modulus is small and the softness is excessively high. Therefore, a polyamide resin having higher performance is being demanded. Under these circumstances, an aromatic dicarboxylic acid such as TPA (terephthalic acid) and IPA (isophthalic acid) is copolymerized with a conventional aliphatic polyamide so as to attain high performance of the polyamide resin. For example, JP 59-155426 A and JP 62-156130 A disclose a polyamide resin in which TPA or IPA is copolymerized.

However, the introduction of an aromatic ring into the polyamide skeleton generally leads to elevation of melting point or melt viscosity, and the production of polyamide is confined to severer conditions such as temperature condition and encounters more acceleration in the production of gelled product, thermal degradation or deterioration due to thermal decomposition reaction. The gelled product may deposit in the polymerization rector to require more frequent cleaning operations or mingle into the resin, or the thermal degradation may bring about reduction in the physical properties, as a result, a high-quality polyamide resin cannot be obtained.

These are mainly attributable to the long-term residence of polyamide resin in a high-temperature condition, and various production methods have been proposed with an attempt to solve these problems. For example, according to the production methods disclosed in JP 60-206828 A, JP 2-187427 A and JP 8-170895 A, an initial condensate is once taken out as a prepolymer so as to avoid the long-term residence under high temperature, and this polymer is solid phase-polymerized at a temperature lower than the melting point of polymer, whereby the thermal decomposition degradation is inhibited. However, these methods all are a batch-system production method and are undesirable in view of production efficiency and also disadvantageous in that the quality readily differs among batches.

As for the polyamide, a large number of aromatic-containing polyamides are also known, where, for example, reduction of water absorption and elevation of elastic modulus are realized by using an aromatic diamine such as p-xylylenediamine (PXD) or m-xylylenediamine (MXD) as a raw material.

The raw materials used in the production of a polyamide are generally a diamine and a dicarboxylic acid as in the production of 6,6-nylon. In this case, for elevating the polymerization degree to a level of allowing for use as a product, it is important to control the mol balance between the diamine component and the dicarboxylic acid component. This problem is generally overcome by employing a method of charging two components of diamine component and dicarboxylic acid component in the form of an aqueous solution, and adjusting the pH to form a salt of amine and carboxylic acid. However, the salt forming method is disadvantageous in that since a large amount of water content must be removed so as to allow the polymerization reaction to proceed, a large quantity of heat is necessary as compared with the amount of production and moreover, the apparatus becomes large. Furthermore, when continuous production is intended, the pH adjustment performed every each batch takes time and therefore, the efficiency is low.

In order to solve these problems in the polymerization method using an aqueous solution of salt, a method of performing continuous polymerization of polyamide without using water as a solvent has been proposed.

For example, JP 10-509760 T employs a method of supplying a dicarboxylic acid excess component in the melted state to a multistage reactor, and adding the lacking diamine component to the reactor. However, in this method, the addition of diamine and the polymerization reaction must be performed in parallel in the polymerization reactor and therefore, the apparatus structure becomes special and complicated.

JP 2001-200052 A discloses a continuous production method of a polyamide, which comprises a step of continuously supplying a slurry comprising a xylylenediamine-containing diamine and a dicarboxylic acid to a ventless twin-screw extruder and heating it to allow for proceeding of amidation reaction, and a step of elevating the polymerization degree of polyamide in a single-screw extruder with a vent while separating and removing the condensed water produced by the amidation reaction. According to this patent publication, a slurry solution of diamine and dicarboxylic acid is prepared by a batch system at a low temperature of 80° C. or less and then the polymerization reaction is initiated. In this method, the problem of large apparatus in the aqueous solution polymerization is overcome, but for preparing a slurry solution without causing an amidation reaction rich in reactivity, the temperature and moisture percentage must be strictly controlled and moreover, the preparation of a homogeneous slurry solution takes time, giving rise to a problem in the productivity. The molecular weight of the polyamide obtained in Examples of this patent publication is low and approximately from 3,000 to 5,000.

JP 2002-516366 T discloses a continuous production method of nylon 66. According to this patent publication, a fused dicarboxylic acid and a fused diamine are mixed in equimolar amounts by using a raw material weighing system to produce a fused reaction mixture, the reaction mixture is passed to a non-ventilative reaction apparatus (static in-line mixer) to form a first product flow containing polyamide and condensed water, the first product flow is supplied to a ventilated tank-type reaction vessel to remove the condensed water and form a second product flow containing polyamide, the second product flow is measured by near infrared spectroscopy to determine relative amounts of amine end group and carboxylic acid end group and based on the values obtained, the dicarboxylic acid weighing system and/or diamine weighing system are controlled.

JP 2002-516365 T discloses a control system for controlling the mol balance between fused dicarboxylic acid and fused diamine, where the balance between carboxylic acid end group and amine end group in the polymerization mixture is detected by using a near infrared spectrometer and based on the detection results, the mass flow rate of at least one of the fused dicarboxylic acid and the fused diamine is adjusted.

However, when the mol balance between dicarboxylic acid and diamine is controlled by the feed back from the downstream polymerization mixture to the upstream raw material supply part, time lag is caused and this is not preferred in respect that the mol balance is difficult to exactly control at all times. Also, such a control system is disadvantageously complicated and costs high.

In order to express properties suitable for respective uses described above, a polyamide having a desired polymerization degree is necessary. Generally, in producing a polyamide, the polymerization degree of product polyamide is determined by measuring its relative viscosity [RV]. The relative viscosity is one of the most important indices in confirming the quality of polyamide.

The polymerization degree has a relationship with, for example, reaction temperature, inner pressure (vacuum degree) of reactor, end group concentration of polymer (addition of end group adjusting agent such as acid anhydride), and moisture percentage in the gas phase at the interface of fused polymer during reaction and therefore, a method of adjusting the polymerization degree by changing any one of these conditions is generally employed.

However, when the polymerization degree is intended to adjust by using only one of those conditions, various status changes are generated other than the polymerization degree and this may adversely affect the quality of polyamide produced. For example, when only the degree of vacuum is adjusted to a high vacuum degree with an attempt to obtain a high polymerization degree, the residence amount of polymer in the polymerization reactor is varied due to change in the holdup brought about by bubbling and generation of contamination, change in the residence time or the like is caused, as a result, a polyamide having an intended quality can be hardly obtained.

Also, when only the end group concentration of polymer is adjusted by the addition of an end group adjusting agent with an attempt to obtain a desired polymerization degree, the end group adjusting agent disadvantageously remains in the product polyamide in a larger amount along with increase in the amount added of the end group adjusting agent.

DISCLOSURE OF THE INVENTION

Object of the Invention

On the other hand, in the continuous production of polyamide, a polymer having a constant quality must be produced at all times by controlling the real-time quality of polymer obtained and feeding it back to the production step. For this purpose, it is considered to on-line measure the melt viscosity of polymer at the reactor outlet in the final polymerization step, decide the polymerization degree, and feedback the results to the conditions in the polymerization step, thereby controlling the polymerization degree of continuously produced polyamide.

An object of the present invention is to provide a continuous production method of a polyamide with stabilized polymerization degree.

An object of the present invention is to provide a continuous production method of a polyamide with good quality, particularly an aromatic-containing polyamide. In particular, an object of the present invention is to provide a continuous production method of a polyamide with excellent strength, good color tone and small water absorption percentage, which is suitable for film, sheet, packaging bag, bottle or the like in uses such as food, beverage, medicament and cosmetic.

An object of the present invention is to provide a continuous production method of a polyamide with good quality, for example, homogeneous aliphatic polyamide, particularly homogeneous aromatic-containing polyamide. In particular, an object of the present invention is to provide a continuous production method of a polyamide comprising an m-xylylenediamine as a diamine component, which is ensured with excellent oxygen barrier property, good color tone and small water absorption percentage and suitable for film, sheet, packaging bag, bottle or the like in uses such as food, beverage, medicament and cosmetic.

SUMMARY OF THE INVENTION

The present inventors have found that when a self-cleaning horizontal twin-screw reaction apparatus is used as the final polymerization reaction apparatus and the operation of controlling the melt viscosity of polymer is performed in the final polymerization reaction apparatus, a polyamide having stabilized polymerization degree can be continuously obtained.

The present inventors have found that when a tubular reaction apparatus is used in the amidation reaction, the thermal degradation can be suppressed and a polyamide with good quality can be continuously obtained.

The present inventors have found that when a melted diamine and a melted dicarboxylic acid as raw materials are introduced into the reaction apparatus by using raw material supply means capable of automatically controlling the mass flow rates of these two raw materials, an optimal mol balance can be achieved and a polyamide with good quality can be continuously obtained.

The present invention includes the following inventions.

(1) A continuous production method of a polyamide, comprising continuously producing a polyamide by melt polymerization using a multistage polymerization reaction apparatus, wherein a self-cleaning horizontal twin-screw reaction apparatus is used as a final polymerization reaction apparatus constituting the multistage polymerization reaction apparatus, wherein the final polymerization is effected while performing an operation of purging inert gas inside the final polymerization reaction apparatus or while performing two or three operations selected from the group consisting of an operation of purging inert gas inside the final polymerization reaction apparatus, an operation of vacuating the final polymerization reaction apparatus, and an operation of adding an end group adjusting agent into the final polymerization reaction apparatus, and wherein the melt viscosity of the polymer is controlled by continuously measuring the melt viscosity of a polymer at an outlet of the final polymerization reaction apparatus by a viscometer and automatically controlling at least one operation amount out of the inert gas purged amount, the vacuum degree and the amount added of the end group adjusting agent corresponding to the above-described operations so that the measured viscosity value becomes a value within a previously set definite range.

(2) The continuous production method of a polyamide as described in (1), wherein in performing two operations selected from the group consisting of the inert gas purging operation, the vacuum operation and the addition operation of an end group adjusting agent, one operation amount out of two operation amounts is set as a fixed value and the other operation amount is automatically controlled.

(3) The continuous production method of a polyamide as described in (1), wherein in performing all the three operations selected from the group consisting of the inert gas purging operation, the vacuum operation and the addition operation of an end group adjusting agent, two operation amounts out of three operation amounts are each set as a fixed value and only the remaining one operation amount is automatically controlled, or only one operation amount out of three operation amounts is set as a fixed value and the other two operation amounts are automatically controlled.

(4) The continuous production method of a polyamide as described in any one of (1) to (3), wherein the inert gas has a moisture percentage of 0.05 wt % or less.

(5) The continuous production method of a polyamide as described in any one of (1) to (4), wherein the polyamide comprises an m-xylylenediamine (MXD) as a diamine component, and the m-xylylenediamine (MXD) content is at least 70 mol % based on the diamine component.

(6) The continuous production method of a polyamide as described in any one (1) to (5), wherein a polyamide having a relative viscosity [RV] of 1.6 to 4.0 is obtained.

The present invention further includes the following inventions.

(7) A continuous production method of a polyamide mainly comprising a diamine component unit and a dicarboxylic acid component unit, the method comprising:

(a) a raw material preparation step of individually melting a diamine and a dicarboxylic acid or forming a salt of amine and carboxylic acid in water, (b) a raw material introduction step of continuously introducing the prepared raw material into a tubular reaction apparatus, (c) an amidation step of passing the introduced raw material through the tubular reaction apparatus, thereby effecting amidation to obtain a reaction mixture containing an amidated product and a condensed water, (d) an initial polymerization step of introducing the reaction mixture into a continuous reaction apparatus capable of separation and removal of water, and elevating the polymerization degree while separating and removing water at a temperature higher than the melting point of the finally obtained polyamide to obtain a polyamide prepolymer, and (e) a final polymerization step of introducing the polyamide prepolymer into a continuous reaction apparatus capable of separation and removal of water, and further elevating the polymerization degree at a temperature higher than the melting point of the finally obtained polyamide to obtain a polyamide adjusted to a desired relative viscosity [RV].

(8) The continuous production method of a polyamide as described in (7), wherein the tubular reaction apparatus used for the amidation step (c) has L/D of 50 or more, wherein the inner diameter of the tube is D (mm) and the length of the tube is L (mm).

(9) The continuous production method of a polyamide as described in (7) or (8), wherein the average residence time in the amidation step (c) is from 10 to 120 minutes.

(10) The continuous production method of a polyamide as described in any one of (7) to (9), wherein the shear rate ($\gamma$) in the amidation step (c) is 0.1 (1/sec) or more and the shear stress ($\tau$) is $1.5 \times 10^{-5}$ Pa or more.

(11) The continuous production method of a polyamide as described in any one of (7) to (10), wherein in the amidation step (c), the relative viscosity [RV] of the reaction mixture is elevated by 0.05 to 0.6.

(12) The continuous production method of a polyamide as described in any one of (7) to (11), wherein the average residence time in the initial polymerization step (d) is from 10 to 150 minutes.

(13) The continuous production method of a polyamide as described in any one of (7) to (12), wherein the continuous reaction apparatus in the final polymerization step (e) is a horizontal reaction apparatus.

(14) The continuous production method of a polyamide as described in any one of (7) to (13), wherein the continuous reaction apparatus in the final polymerization step (e) is a self-cleaning horizontal twin-screw reaction apparatus.

(15) The continuous production method of a polyamide as described in any one of (7) to (14), wherein the average residence time in the final polymerization step (e) is from 1 to 30 minutes.

(16) The continuous production method of a polyamide as described in any one of (7) to (15), wherein the relative viscosity [RV] of the polyamide obtained in the final polymerization step (e) is from 1.6 to 4.0.

(17) The continuous production method of a polyamide as described in any one of (7) to (16), wherein in the final polymerization step (e), the relative viscosity [RV] of the polyamide is controlled by an operation of purging inert gas inside the reaction apparatus, an operation of adjusting vacuum degree in the reaction apparatus, an operation of adding an end group adjusting agent into the reaction apparatus, or a combination thereof.

(18) The continuous production method of a polyamide as described in any one of (7) to (17), wherein in the final polymerization step (e), the final polymerization is effected while performing an operation of purging inert gas inside the reaction apparatus or while performing two or three operations selected from the group consisting of an operation of purging inert gas inside the reaction apparatus, an operation of vacuating the reaction apparatus, and an operation of adding an end group adjusting agent into the reaction apparatus, and wherein the melt viscosity of the polymer is controlled by continuously measuring the melt viscosity of a polymer at an outlet of the final polymerization reaction apparatus by a viscometer and automatically controlling at least one operation amount out of the inert gas purged amount, the vacuum degree and the amount added of the end group adjusting agent corresponding to the above-described operations so that the measured viscosity value becomes a value within a previously set definite range.

(19) The continuous production method of a polyamide as described in any one of (7) to (18), wherein in the raw material preparation step (a), the atmospheric oxygen concentration at the preparation of raw material is 10 ppm or less.

(20) The continuous production method of a polyamide as described in any one of (7) to (19), wherein the polyamide comprises at least one member selected from the group consisting of the following repeating units (I) to (V):

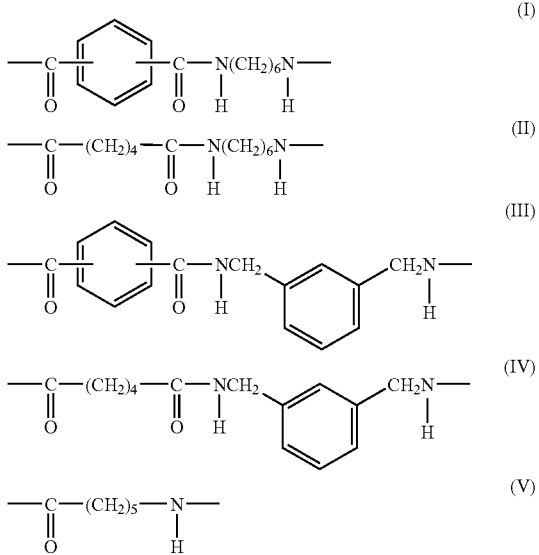

(21) The continuous production method of a polyamide as described in (20), wherein the polyamide comprises at least one member selected from the group consisting of the repeating units (I), (III) and (IV).

(22) The continuous production method of a polyamide as described in any one of (7) to (21), wherein the polyamide comprises an m-xylylenediamine (MXD) as a diamine component, and the m-xylylenediamine (MXD) content is at least 70 mol % based on the diamine component.

The present invention further includes the following inventions.

(23) A continuous production method of a polyamide mainly comprising a diamine component unit and a dicarboxylic acid component unit, the method comprising:

(a) a raw material preparation step of individually preparing a melted diamine and a melted dicarboxylic acid, (b) a raw material introduction step of continuously introducing the melted diamine and the melted dicarboxylic acid into a polymerization reaction apparatus to get a diamine and a carboxylic acid together by using raw material supply means comprising a raw material supply device, a mass flow rate measuring device provided on the downstream side of the raw material supply device and a control system of automatically controlling the output of the supply device such that the mass flow rate measured by the mass flow rate measuring device becomes a previously set value, and a polymerization step of polycondensing the diamine and the dicarboxylic acid introduced into the polymerization reaction apparatus.

(24) A continuous production method of a polyamide mainly comprising a diamine component unit and a dicarboxylic acid component unit, the method comprising:

(a) a raw material preparation step of individually preparing a melted diamine and a melted dicarboxylic acid, (b) a raw material introduction step of continuously introducing the melted diamine and the melted dicarboxylic acid into a tubular reaction apparatus to get a diamine and a carboxylic acid together by using raw material supply means comprising a raw material supply device, a mass flow rate measuring device provided on the downstream side of the raw material supply device and a control system of automatically controlling the output of the supply device such that the mass flow rate measured by the mass flow rate measuring device becomes a previously set value, (c) an amidation step of passing the diamine and dicarboxylic acid gotten together through the tubular reaction apparatus, thereby effecting amidation to obtain a reaction mixture containing an amidated product and a condensed water, (d) an initial polymerization step of introducing the reaction mixture into a continuous reaction apparatus capable of separation and removal of water, and elevating the polymerization degree while separating and removing water at a temperature higher than the melting point of the finally obtained polyamide to obtain a polyamide prepolymer, and (e) a final polymerization step of introducing the polyamide prepolymer into a self-cleaning horizontal twin-screw reaction apparatus capable of separation and removal of water, and further elevating the polymerization degree at a temperature higher than the melting point of the finally obtained polyamide to obtain a polyamide adjusted to a desired relative viscosity [RV].

(25) The continuous production method of a polyamide as described in (24), wherein in the tubular reaction apparatus used for the amidation step (c) has L/D or 50 or more, wherein the inner diameter of the tube is D (mm) and the length of the tube is L (mm).

(26) The continuous production method of a polyamide as described in (24) or (25), wherein the average residence time in the final polymerization step (e) is from 1 to 30 minutes.

(27) The continuous production method of a polyamide as described in any one (24) to (26), wherein the relative viscosity [RV] of the polyamide obtained in the final polymerization step (e) is from 1.6 to 4.0.

(28) The continuous production method of a polyamide as described in any one of (24) to (27), wherein in the final polymerization step (e), the relative viscosity [RV] of the polyamide is controlled by an operation of purging inert gas inside the reaction apparatus, an operation of adjusting vacuum degree in the reaction apparatus, an operation of adding an end group adjusting agent into the reaction apparatus, or a combination thereof.

(29) The continuous production method of a polyamide as described in any one of (24) to (28), wherein in the final polymerization step (e), the final polymerization is effected while performing an operation of purging inert gas inside the reaction apparatus or while performing two or three operations selected from the group consisting of an operation of purging inert gas inside the reaction apparatus, an operation of vacuating the reaction apparatus, and an operation of adding an end group adjusting agent into the reaction apparatus, and wherein the melt viscosity of the polymer is controlled by continuously measuring the melt viscosity of a polymer at an outlet of the final polymerization reaction apparatus by a viscometer and automatically controlling at least one operation amount out of the inert gas purged amount, the vacuum degree and the amount added of the end group adjusting agent corresponding to the above-described operations so that the measured viscosity value becomes a value within a previously set definite range.

(30) The continuous production method of a polyamide as described in any one of (24) to (29), wherein in the raw material preparation step (a), the atmospheric oxygen concentration at the preparation of raw material is 10 ppm or less.

(31) The continuous production method of a polyamide as described in any one (24) to (30), wherein the polyamide comprises an m-xylylenediamine (MXD) as a diamine component, and the m-xylylenediamine (MXD) content is at least 70 mol % based on the diamine component.

(32) The continuous production method of a polyamide as described in any one (24) to (31), wherein the relative viscosity [RV] of the polyamide obtained in the final polymerization step (e) is from 1.6 to 4.0.

According to the present invention, a production method of a polyamide with stabilized polymerization degree and good quality, and a continuous production method of a polyamide with stabilized polymerization degree and good quality are provided.

According to the present invention, a continuous production method of a polyamide with good quality, particularly a homogeneous aromatic-containing polyamide, is provided. In the method of the present invention, a polyamide comprising an m-xylylenediamine as a diamine component, which is ensured with excellent oxygen barrier property, good color tone and small water absorption percentage and suitable for film, sheet, packaging bag, bottle or the like in uses such as food, beverage, medicament and cosmetic, is continuously and homogeneously produced. This polyamide comprising an m-xylylenediamine as a component can also be used for the reforming of a heteropolymer such as polyethylene terephthalate.

MODE FOR CARRYING OUT THE INVENTION

Figure 1:
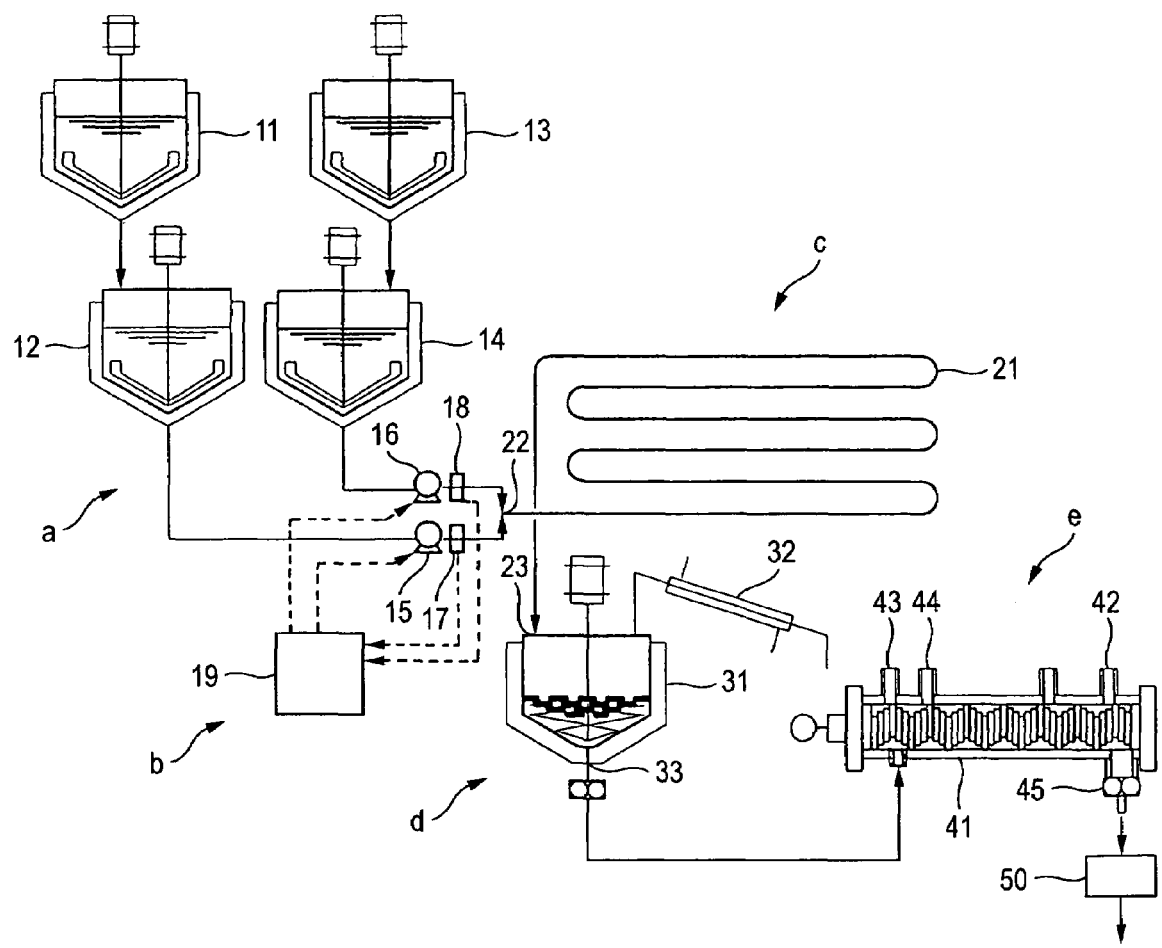
FIG. 1 is a flow chart roughly showing the process in the preferred continuous production method of a polyamide of the present invention.

As for the production method of a polyamide by melt polymerization, production methods such as a batch system, a combination of batch system and solid phase polymerization, and a continuous production using a multistage polymerization reactor are being employed. The melt viscosity control of the present invention may be applied to these conventionally known production methods but in particular, the melt viscosity control of the present invention is preferably applied to the continuous production of a polyamide, because in the continuous production, it is necessary to produce a polymer having a constant quality at all times by controlling the real-time quality of polymer obtained and feeding it back to the production step.

The continuous production method of the present invention can be applied to either an aliphatic polyamide or an aromatic-containing polyamide, and such a polyamide comprises at least one member selected from the repeating units (I) to (V).

From the standpoint of reducing the water absorption percentage, it is important that the polyamide has an aromatic ring. The polyamide suitable for this purpose comprises at least one member selected from the repeating units (I), (III) and (IV). The continuous production method of the present invention can be preferably applied to an aromatic-containing polyamide of which production is in more difficult conditions.

Examples of the aromatic-containing polyamide include a polyamide comprising 70 mol % or more of m-xylylenediamine (MXD) as an amine component, which is a useful oxygen barrier material.

In view of oxygen barrier and water absorption, it is important that the polyamide contains an m-xylylenediamine in an amount of 70 mol % or more based on the diamine component. A smaller amount of m-xylylenediamine is advantageous in the light of thermal degradation and color tone but from the standpoint of oxygen barrier, the m-xylylenediamine content must be 70 mol % or more, preferably 75 mol % or more. On the other hand, from the aspect of water absorption, MXD itself has an aromatic ring and the water absorption percentage is advantageously small as compared with aliphatic polyamides such as nylon 6 and nylon 66. However, the water absorption may be further improved by copolymerizing an aromatic dicarboxylic acid such as terephthalic acid or isophthalic acid.

Preferred examples of the polyamide include (1) a polyamide starting from TPA (terephthalic acid), HMDA (hexamethylenediamine) and CLM (caprolactam) and having the repeating units (I) and (V) (this polyamide is simply referred to as "HCT"), (2) a polyamide starting from IPA (isophthalic acid), ADA (adipic acid) and MXD (m-xylylenediamine) and having the repeating units (III) and (IV) (this polyamide is simply referred to as "MIA"), (3) a polyamide starting from TPA, IPA and HMDA and having the repeating unit (I) (this polyamide is simply referred to as "HIT"), (4) a polyamide starting from TPA, ADA and HMDA and having the repeating units (I) and (II) (this polyamide is simply referred to as "HTA"), (5) a polyamide starting from IPA, ADA and MXD and having the repeating units (III) and (IV) (this polyamide is simply referred to as "MIA"), (6) a polyamide starting from IPA, ADA, HMDA and MXD and having the repeating units (I), (II), (III) and (IV) (this polyamide is simply referred to as "HMIA"), (7) a polyamide starting from MXD and ADA and having the repeating unit (IV) (this polyamide is simply referred to as "MA"), and (8) a polyamide starting from MXD, ADA and TPA and having the repeating units (III) and (IV) (this polyamide is simply referred to as "MTA").

As the amount of the aromatic dicarboxylic acid unit constituting the polyamide increases, the polyamide is decreased in the water absorption percentage and increased in the dimensional stability and a high-elasticity and high-strength polyamide is obtained. In this way, a large amount of aromatic dicarboxylic acid unit is advantageous in view of physical and mechanical properties, but the introduction of aromatic ring gives rise to elevation of melting point or melt viscosity of the polyamide and the production conditions of polyamide become severer, as a result, the production of polyamide tends to be difficult. Furthermore, the operability at the shaping changes for the worse and a product with stabilized quality can be hardly obtained.

The amount of the aromatic dicarboxylic acid varies depending on the structure of polyamide but in the case of a terephthalic acid, the amount thereof is preferably from 3 to 75 mol %, more preferably from 5 to 70 mol %, based on the dicarboxylic acid component, and in the case of an isophthalic acid, the amount thereof is preferably from 5 to 90 mol %, more preferably from 10 to 85 mol %, based on the dicarboxylic acid. If the amount of terephthalic acid or isophthalic acid exceeds the upper limit in such a range, problems described above are caused, whereas if it is less than the lower limit, dimensional stability or mechanical property decreases.

In the case of the polyamide MA starting from m-xylylenediamine MXD and adipic acid ADA and having the repeating unit (IV), it is important in view of oxygen barrier and water absorption that the polyamide contains 70 mol % or more of m-xylylenediamine based on the diamine component. A smaller amount of m-xylylenediamine is advantageous in the light of thermal degradation and color tone but from the standpoint of oxygen barrier, the m-xylylenediamine content must be 70 mol % or more, preferably 75 mol % or more. On the other hand, from the aspect of water absorption, MXD itself has an aromatic ring and the water absorption percentage is advantageously small as compared with aliphatic polyamides such as nylon 6 and nylon 66. However, the water absorption may be further improved by copolymerizing an aromatic dicarboxylic acid such as terephthalic acid or isophthalic acid.

In the production of a polyamide of the present invention, a raw material having polyamide-forming ability, other than the above-described diamine, dicarboxylic acid and lactam, may be copolymerized as needed in view of performance required of the polyamide.

Examples of the diamine component include aliphatic diamines such as ethylenediamine, 1-methylethyldiamine, 1,3-propylenediamine, tetramethylenediamine, penta-methylenediamine, heptamethylenediamine, octamethylene-diamine, nonamethylenediamine, decamethylenediamine, undecamethylenediamine and dodecamethylenediamine. Other examples include cyclohexanediamine, bis(4,4'-aminohexyl)methane and p-xylylenediamine.

Examples of the dicarboxylic acid component include aliphatic dicarboxylic acids such as malonic acid, succinic acid, glutaric acid, sebacic acid, pimelic acid, suberic acid, azelaic acid, undecanoic acid, undecadionic acid, dodecadionic acid and dimer acid, 1,4-cyclohexanedicarboxylic acid, p-xylylenedicarboxylic acid, m-xylylenedicarboxylic acid, phthalic acid, 2,6-naphthalenedicarboxylic acid and 4,4'-diphenyldicarboxylic acid.

Other than these diamine and dicarboxylic acid components, a lactam such as laurolactam, aminocaproic acid and aminoundecanoic acid, and an aminocarboxylic acid may also be used as a copolymerization component.

In view of physical and mechanical properties of the shaped article obtained as well as operation stability, the relative viscosity [RV] of the polyamide resin is preferably from 1.6 to 4.0. If the [RV] is less than 1.6, this not only results in giving a shaped article having poor mechanical properties but also tends to greatly affect the operational aspect, such as generation of vent-up, difficult removal of polymer strand and cracking at the formation into chips, whereas if [RV] exceeds 4.0, the melt viscosity elevates to render the shaping conditions severer, as a result, a shaped article having stabilized quality tends to be difficultly obtained and the product cannot be expected to have physical properties worthy of the labors required. Furthermore, elevation of the [RV] to exceed 4.0 requires increase of the purged amount with inert gas or application of a high vacuum degree and this disadvantageously incurs cost rise or unstable operation such as vent-up. The [RV] is more preferably from 1.9 to 3.8.

The amino end group concentration [AEG] and carboxyl end group concentration [CEG] of the polyamide resin each correlates with the above-described relative viscosity [RV] or a molar ratio between dicarboxylic acid and diamine. The [AEG] and [CEG] of polyamide resin generally used in practice are both 200 (meq/kg) or less. These values are appropriately selected in accordance with use end of the polyamide.

According to the continuous production method of the present invention, the [AEG] and [CEG] can be effectively prevented from dispersion. The dipsersions of [AEG] and [CEG] are expressed by their standard deviation or fluctuation range (difference between maximum value and minimum value in aging) and as these values re smaller, the quality of polyamide is advantageously more homogeneous. The standard deviation of [AEG] is preferably 10 (meq/kg) or less and the standard deviation of [CEG] is also preferably 10 (meq/kg) or less.

The polyamide resin is less yellow-tinted and superior in the color tone as the color tone [Co-b] value is smaller. Generally, when the [co-b] is from −3 to 3, there arises no problem as a product. If the [Co-b] is less than −3, the difference provided in the obtained color tone is out of the visible range and unworthy of the labors required to achieve such a color tone value and this is meaningless, whereas if the [Co-b] exceeds 3, the yellow tinting increases and this worsened color tone is clearly viewed still in the product produced. The [Co-b] is preferably from -2.5 to 2.8.

The water absorption percentage of the polyamide resin is an index for the dimensional change of a shaped article between drying time and moisture absorption time. The water absorption percentage is preferably smaller, because the dimensional change becomes larger as the water absorption percentage is higher. The water absorption percentage is preferably 7% or less, more preferably 6.7% or less. Since the dimensional stability is more excellent as the water absorption percentage is lower, the lower limit of the water absorption percentage is not particularly specified. However, in view of properties inherent in polyamide, it is technically difficult to obtain a polyamide having a water absorption percentage of 3.5% or less.

The continuous production method of a polyamide of the present invention is described below by referring to FIG. 1. FIG. 1 is a flow charge roughly showing the preferred process in the continuous production method of a polyamide of the present invention. In FIG. 1, the continuous production method of a polyamide comprises a raw material preparation step (a), a raw material introduction step (b), an amidation step (c), an initial polymerization step (d) and a final polymerization step (e). That is, in this example, the polymerization process comprises an amidation step (c), an initial polymerization step (d) and a final polymerization step (e).

Raw Material Preparation Step:

The raw material preparation step includes a method of individually melting a diamine and a dicarboxylic acid and supplying each melted monomer directly to the amidation step, and a method of forming a salt of amine and carboxylic acid in water and supplying an aqueous solution of the salt to the amidation step.

1. Method of Directly Supplying Melted Monomer

The raw material preparation equipment mainly comprises a dicarboxylic acid melting tank (11), a storage tank (12) for the dicarboxylic acid melted liquid, a diamine melting tank (13) and a storage tank (14) for the diamine melted liquid. An example of this case is shown in FIG. 1.

The melting temperature and storing temperature of dicarboxylic acid each is suitably from its melting point to melting point +50° C. (a temperature 50° C. higher than the melting point). If the melting temperature and storing temperature are excessively high, this disadvantageously induces thermal decomposition or degradation of raw materials, whereas if these temperatures are too low, non-uniform melting results to cause bad precision in the raw material supply to the amidation step and this is not preferred. The melting temperature and storing temperature are preferably from melting point +5° C. to melting point +25° C. The same applies to diamine and the melting temperature and storing temperature of diamine each is suitably from its melting point to melting point +50° C., preferably from melting point +5° C. to melting point +25° C. Usually, a diamine which is liquid at ordinary temperature is preferred.

For both of the dicarboxylic acid and the diamine, the melting tank and storage tank at the raw material preparation are preferably laid in an inert gas atmosphere, for example, nitrogen gas atmosphere, so as to prevent thermal oxidation decomposition or thermal decomposition. At this time, from the standpoint of preventing mingling of outer air, the inert gas atmosphere is preferably under pressure of 0.05 to 0.8 MPa, more preferably from 0.1 to 0.6 MPa.

In this raw material preparation step, the dicarboxylic acid and the diamine are individually melted. These individually melted dicarboxylic acid and diamine are continuously supplied at a predetermined molar ratio to the amidation step in the raw material introduction step.

2. Salt Forming Method

This is an embodiment not shown in FIG. 1. The salt forming method is advantageous for the production of a polyamide starting from a dicarboxylic acid not having a melting point, such as terephthalic acid and isophthalic acid. The raw material preparation equipment mainly comprises a salt forming tank, a storage tank for an aqueous solution of the obtained salt, and a supply pump.

The salt forming tank is the equipment for uniformly mixing the raw materials of polyamide, such as dicarboxylic acid, diamine, lactam and aminocarboxylic acid, in water to obtain an aminocarboxylate solution. In this salt forming step, the molar ratio between amino group and carboxyl group may be arbitrarily adjusted according to the desired physical properties of the product. However, if the molar ratio largely deviates from amino group/carboxyl group =1 (by mol), not only a polyamide having a desired [RV] cannot be obtained but also troubles in view of equipment, such as occurrence of vent-up of polymer, are disadvantageously caused.

At this raw material preparation, an alkali metal compound or a phosphorus compound may be added for the purpose of preventing thermal oxidation decomposition or as a polymerization catalyst.

The salt concentration of aminocarboxylate produced in the salt forming step varies depending on the kind of polyamide and is not particularly limited, but in general, the salt concentration is preferably from 30 to 90 wt %. If the salt concentration exceeds 90 wt %, the salt precipitates with slight fluctuation in the temperature to clog a pipe or the equipment must be resistant against high temperature and high pressure so as to elevate the solubility of salt and this is disadvantageous in view of cost, whereas if the salt concentration is less than 30 wt %, the amount of water evaporated after the initial polymerization step increases and this is not only disadvantageous in view of energy but also gives rise to cost rise due to reduction in productivity. The salt concentration is preferably from 35 to 85 wt %.

The conditions in the salt forming step vary depending on the kind of polyamide and the salt concentration, but in general, the temperature is from 60 to 180° C. and the pressure is from 0 to 1 MPa. If the temperature exceeds 180° C. or the pressure exceeds 1 MPa, the equipment must have resistance against high temperature and high pressure and costs high and this is not preferred, whereas if the temperature is less than 60° C. or the pressure is less than 0 MPa, not only troubles such as clogging of a pipe due to precipitation of salt are caused but also the salt concentration can be hardly elevated, resulting in reduction of productivity. The conditions are preferably such that the temperature is from 70 to 170° C. and the pressure is from 0.05 to 0.8 MPa, more preferably such that the temperature is from 75 to 165° C. and the pressure is from 0.1 to 0.6 MPa.

The storage tank for the aqueous solution of salt is fundamentally sufficient if precipitation of salt does not occur, and the conditions for the salt forming step can be applied as-is.

The thus-prepared aqueous solution of salt is continuously supplied to the amidation step by a supply pump in the raw material introduction step. The supply pump used here must have excellent quantitativity. The fluctuation in the supply amount works out to fluctuation of process in the amidation step, as a result, the obtained polyamide has a large deviation of relative viscosity [RV] and the quality thereof is not stabilized. In this meaning, the supply pump is preferably a plunger pump excellent in the quantitativity.

3. Oxygen Concentration at Raw Material Preparation

The atmospheric oxygen concentration at the raw material preparation greatly affects the color tone of polyamide obtained. In particular, this tendency is outstanding for the polyamide using an m-xylylenediamine as a raw material. When the atmospheric oxygen concentration at the raw material preparation is 10 ppm or less, there arises no problem, but if the oxygen concentration exceeds 10 ppm, the obtained polyamide is strongly yellow-tinted and the grade of product tends to decrease. The lower limit of the oxygen concentration is not particularly specified but, for example, 0.05 ppm or more. In the production of polyamide, an oxygen concentration of less than 0.05 ppm raises no problem, but only an excessively complicated step of removing oxygen is necessary for achieving an oxygen concentration of less than 0.05 ppm and other physical properties including color tone are scarcely affected. The oxygen concentration is preferably from 0.05 to 9 ppm, more preferably from 0.05 to 8 ppm.

In the present invention, a process of supplying raw materials to a preparation tank (melting tank or raw material salt forming tank) from which oxygen is previously removed to an oxygen concentration of 10 ppm or less, a process of charging raw materials into a preparation tank (melting tank or raw material salt forming tank) and then removing oxygen inside the preparation tank to provide an atmosphere having an oxygen concentration of 10 ppm or less, or a combination thereof may be used. This may be selected in the light of equipment or operation. The atmosphere inside the storage tank is also preferably made to have an oxygen concentration of 10 ppm or less.

The removal of oxygen may be performed by a vacuum displacement method, a compression displacement method or a combination thereof. As for the vacuum degree or compression degree applied to displacement and the number of displacements, conditions ensuring highest efficiency in achieving the desired oxygen concentration may be selected.

Raw Material Introduction Step:

In the raw material introduction step, in the case of the method of directly supplying the melted monomers, the dicarboxylic acid and diamine individually melted in the raw material preparation step are continuously introduced into an inlet (22) of a tubular reaction apparatus for the amidation step by using raw material supply means through respective pipe lines from respective storage tanks (12) and (14), thereby getting a diamine and a dicarboxylic acid together.

In the case of the salt forming method, the salt aqueous solution prepared in the raw material preparation step is continuously introduced into the inlet (22) of a tubular reaction apparatus for the amidation step by a supply pump through a pipe line.

The raw material supply means preferably comprises raw material supply devices (15) and (16), mass flow rate measuring devices (17) and (18) provided on the downstream side of (preferably immediately after) the raw material supply devices (15) and (16), respectively, and a control system (19) of automatically controlling the outputs of the supply devices (15) and (16) such that the mass flow rate measured by each of the mass flow rate measuring devices (17) and (18) becomes a previously set value. The mass flow rate measuring devices (17) and (18) must be provided on the upstream side than the confluence of diamine and dicarboxylic acid.

For performing high-precision supply by using the automatic control sysem (19), it is important that the supply precision of the raw material supply devices (15) and (16) themselves is within 1.5%. The precision of the raw material supply devices (15) and (16) is preferably 1% or less, more preferably 0.5% or less, still more preferably 0.25% or less. The raw material supply device is preferably a plunger pump because of its excellent quantitativity.

In the present invention, mass flow rate measuring devices (17) and (18) are provided on the downstream side of, preferably immediately after, the raw material supply devices (15) and (16), respectively. As for the mass flow rate measuring devices (17) and (18), a flowmeter such as Coriolis type may be used.

The mass flow rates of respective materials continuously fed out from the raw material supply devices (15) and (16) are continuously measured by the mass flow rate measuring devices (17) and (18). The measured mass flow rate of each raw material is sent to the control unit (19). In the control unit (19), respective mass flow rate values of dicarboxylic acid and diamine are previously set to give a desired mol balance. When the measured mass flow rate value of each raw material deviates from this set value, the control unit (19) sends a control signal to each raw material supply device (15) or (16) for controlling the output of the device to return each mass flow rate to the set value, whereby the output of each raw material supply device (15) or (16) is controlled. In this way, the mass flow rate value of each raw material is automatically controlled, and a dicarboxylic acid and a diamine are continuously introduced into the inlet (22) of the tubular reaction apparatus while keeping the desired mol balance according to the end use of polymer at all times. Thus, in the raw material introduction step of the present invention, the mass flow rate of each raw material continuously fed out from the raw material supply device is continuously measured by the mass flow rate measuring device, and each raw material is continuously introduced at a predetermined molar ratio into the polymerization reaction apparatus to get a diamine and a dicarboxylic acid together, while automatically controlling the output of the supply device such that the measured mass flow rate becomes a previously set value.

When the mass flow rate measuring devices (17) and (18) are provided immediately after the raw material supply devices (15) and (16), respectively, the time lag between the supply device (15) or (16)and the mass flow rate measuring device (17) or (18) is remarkably decreased and this is very preferred because the measured mass flow rate value of each material is promptly reflected in the supply device (15) or (16).

Here, it is important to use a mass flow rate measuring device as the flow rate measuring device. If a volume flow rate measuring device is used, the control cannot be performed exactly, because the volume of raw material is affected by the ambient temperature.

Amidation Step:

In the amidation step, the diamine and dicarboxylic acid continuously introduced into the inlet (22) of a tubular reaction apparatus and got together, or a salt aqueous solution (in the case of the salt forming method) are(is) passed through a tubular reaction apparatus (21), thereby effecting amidation to obtain a reaction mixture containing an amidated product of low polymerization degree and a condensed water. In the tubular reaction apparatus (21), separation and removal of water are not performed.

In the tubular reaction apparatus (21), assuming that the inner diameter of the tube is D (mm) and the length of the tube is L (mm), L/D is preferably 50 or more. The tubular reaction apparatus is advantageous in that, for example, the liquid level need not be controlled in view of its structure, the plug flow property is high, the pressure resistance is excellent, and the equipment cost is low. In the case where L/D is less than 50, if L is small, the residence time of the reaction mixture flow is shortened and the degree of elevation in the relative viscosity [RV] is small, whereas if D is large, the plug flow property decreases and a residence time distribution is produced, as a result, the desired function is not fulfilled. The upper limit of L/D is not particularly limited but is about 3,000 in the light of residence time and degree of elevation in the relative viscosity [RV]. The lower limit of L/D is more preferably 60 or more, still more preferably 80 or more, and the upper limit thereof is more preferably 2,000 or less, still more preferably 1,000 or less. The lower limit of L is preferably 3 m or more, more preferably 5 m or more, and the upper limit thereof is preferably 50 m or less, more preferably 30 m or less.

The reaction conditions in the tubular reaction apparatus (21) vary depending on the structure of polyamide and the objective polymerization degree but, for example, the inner temperature is from 110 to 310° C., the inner pressure is from 0 to 5 MPa, and the average residence time in tube of the reaction mixture is from 10 to 120 minutes. The polymerization degree of the amidated product can be controlled by the inner temperature, inner pressure and average residence time.

If the average residence time is less than 10 minutes, the polymerization degree of the amidated product with low polymerization degree decreases, as a result, entrainment, vent-up or the like occurs in the later step and the operation tends to be unstable, whereas if the average residence time exceeds 120 minutes, the amidation reaches equilibrium to allow for no elevation of [RV] any more and in the meantime, the thermal degradation disadvantageously proceeds. The average residence time is preferably from 12 to 110 minutes, more preferably from 15 to 100 minutes. The average residence time can be controlled by adjusting the tube inner diameter D or tube length L of the tubular reaction apparatus or changing the supply amount of raw material.

The polycondensation reaction in the amidation step preferably causes the relative viscosity [RV] of the reaction mixture to increase by 0.05 to 0.6 between inlet (22) and outlet (23) of the tubular reaction apparatus (21). If the increase of [RV] is less than 0.05, similarly to the case having a short residence time, the polymerization degree of the amidated product is low, as a result, entrainment, vent-up or the like occurs in the later step and the operation tends to be unstable, whereas if the increase of [RV] exceeds 0.6, thermal degradation readily proceeds due to the effect of coexisting condensed water (in the case of salt forming method, water used for the formation of salt, and condensed water). Furthermore, the reaction mixture excessively elevated in the viscosity gives rise to clogging of a pipe and this may adversely affect the operation. The increase of [RV] in the amidation step is preferably from 0.15 to 0.5, more preferably from 0.2 to 0.4.

In order to assure the plug flow property in the amidation step, it is preferred that the shear rate ($\gamma$) is 0.1 (1/sec) or more and the shear stress ($\tau$) is $1.5 \times 10^{-5}$ Pa or more. If either one of the shear rate and shear stress decreases the above-described range, the residence time distribution of the reaction mixture is broadened and coloration of polyamide or fluctuation of process may occur. The shear rate ($\gamma$) is preferably 0.3 or more and the shear stress ($\tau$) is preferably $2.0 \times 10^{-5}$ Pa or more. These are not particularly limited in the upper limit but usually, the shear rate ($\gamma$) is 100 (1/sec) or less and the shear stress ($\tau$) is $3 \times 10^{-2}$ Pa or less.

Initial Polymerization Step:

In the initial polymerization step, the reaction mixture containing an amidated product with low polymerization degree and a condensed water (in the case of salt forming method, also water used for the formation of salt), obtained in the amidation step, is introduced into a continuous reaction apparatus capable of separation and removal of water, and the polymerization degree thereof is elevated while separating and removing water at a temperature higher than the melting point of the finally obtained polyamide to obtain a polyamide prepolymer.

In the initial polymerization step, the equipment used may be a vertical stirring tank, a centrifugal thin-film evaporator or the like but is preferably a vertical stirring tank (31) in which the reaction conditions can be easily controlled. The vertical stirring tank (31) is constructed to continuously receive the reaction mixture from the outlet (23) of amidation step, comprise a separation and removal device (32), and continuously discharge the polyamide prepolymer from the bottom (33).

As for the reaction conditions in the initial polymerization step, for example, the inner temperature is from the melting point (Tm) of the finally obtained polyamide to Tm+90° C., the inner pressure is from 0 to 5 MPa, and the average residence time is from 10 to 150 minutes. The reaction conditions are preferably such that the inner temperature is from the melting point (Tm) of polyamide to Tm+80° C., the inner pressure is from 0 to 4 MPa, and the average residence time is from 15 to 140 minutes, and more preferably such that the inner temperature is from the melting point (Tm) of polyamide to Tm+70° C., the inner pressure is from 0 to 3.5 MPa, and the average residence time is from 20 to 130 minutes. If the reaction conditions deviate from these ranges, the polymerization degree achieved may be excessively low or thermal degradation or reduction of productivity may occur and this is not preferred. The polymerization degree of the polyamide prepolymer can be controlled by the inner temperature, inner pressure or average residence time.

Final Polymerization Step:

In the final polymerization step, the polyamide prepolymer obtained in the initial polymerization step is introduced into a continuous polymerization reactor capable of separation and removal of water, and the polymerization degree thereof is further elevated at a temperature higher than the melting point of the finally obtained polyamide to obtain a polyamide adjusted to a desired relative viscosity [RV].

The continuous reaction apparatus used in the final polymerization step is preferably a horizontal twin-screw reaction apparatus having self-cleaning property. In a horizontal twin-screw reaction apparatus generally used for the polymerization reaction (see, for example, JP 50-21514 B and JP 48-84781 A), the residence amount in the kettle varies and therefore, when this apparatus is used over a long time for the production of a polyamide, in which thermal change readily occurs, the quality of the product polyamide is disadvantageously impaired due to staining on the inner wall of kettle.

In order to reduce such adverse effects, a single-screw extruder or twin-screw extruder having a property of self-cleaning the inner wall of kettle can be used. A twin-screw extruder is generally preferred because of its good reaction efficiency and certain level of self-cleaning property. However, in the twin-screw extruder, not only the entire inside of the apparatus cannot be vacuumized but also in the case of a material with low melt viscosity, vent-up readily occurs. Furthermore, this apparatus is disadvantageous in that the temperature control is difficult due to high shear forth and the latitude of residence time is limited. Moreover, in order to prolong the residence time, there arise problems such as large apparatus and high equipment cost.

Therefore, the continuous reaction apparatus used here is preferably a self-cleaning horizontal twin-screw reaction apparatus (41), for example, SCR manufactured by Mitsubishi Heavy Ind., Ltd. In the self-cleaning horizontal twin-screw reaction apparatus (41), blades (rotors) twistedly superposed with a slight clearance are constituting two parallel driving shafts, and these two parallel driving shafts are rotated in the same direction. The clearance between a blade and a blade is preferably smaller because the cleaning effect of blades with each other is higher. In the self-cleaning horizontal twin-screw reaction apparatus, the clearance between a blade and a blade greatly changes according to the size of apparatus but in the case of a reaction apparatus having an inner volume of about 0.15 m$^3$, the clearance between a blade and a blade is preferably 50 mm or less, more preferably 20 mm or less, still more preferably 10 mm or less.

In the self-cleaning horizontal twin-screw reaction apparatus, the clearance between the blade and the inner wall is small as compared with general horizontal twin-screw reactors and therefore, the inner wall is cleaned along with the rotation of driving shafts. The clearance between the blade and inner wall varies depending on the size of apparatus but in the case of a reaction apparatus having an inner volume of about 0.15 m$^3$, the clearance between the blade and the inner wall is preferably 15 mm or less, more preferably 10 mm or less, still more preferably 5 mm or less.

In terms of the small clearance between the blade and the inner wall, SCR is the same as the twin-screw extruder, but as compared with the twin-screw extruder having a fairly large clearance between a blade and a blade and rotating the driving shafts in opposite directions, only a slight clearance is present between a blade and a blade and the parallel two driving shafts rotate in the same direction, so that the effect of cleaning the blades with each other can be more elevated. By virtue of the self-cleaning effect, reduction in the adherence of scales and enhancement of quality due to reduced contamination are obtained and therefore, SCR is suitably used for the production of a polyamide, in which thermal degradation readily occurs during reaction. Unlike the twin-screw extruder, the inside of the apparatus can be entirely vacuumized and therefore, a vacuum can be applied also in the case of a material with low melt viscosity. Furthermore, SCR is advantageous in that the heat generation due to shear force is small, the residence time is relatively long, the ability to adapt to fluctuation of viscosity or flow rate is high, and the width of production possibility viscosity is wide. Also, in view of equipment, SCR is advantageous in that compactification is possible as compared with the twin-screw extrude, and the cost is low.

The reaction conditions in the final polymerization step vary depending on the kind of polyamide and the desired relative viscosity [RV], but the resin temperature is from the melting point (Tm) of polyamide to Tm+80° C., preferably from the melting point to Tm+70° C. If the resin temperature exceeds Tm+80° C., deterioration of polyamide is readily accelerated and gives rise to reduction in physical properties or coloration, whereas if it is less than Tm, there is a risk that the polyamide is solidified and causes damage to the reaction apparatus. The average residence time in the continuous reactor varies depending on the kind of polyamide, the desired relative viscosity [RV], the vacuum degree, the addition of an acid anhydride compound described later, the inert gas purging described later, or the like but is preferably from 1 to 30 minutes. If the average residence time is less than 1 minute, a polyamide having [RV] of 1.6 to 4.0 is difficult to obtain, whereas if the average residence time exceeds 30 minutes, the amount of the polymer supplied to the continuous reactor must be decreased and this causes serious reduction in the productivity. The average residence time is preferably from 1.5 to 25 minutes, more preferably from 2 to 20 minutes.

The screw rotation number (rpm) of the reaction apparatus SCR less affects the polymerization reaction or average residence time unlike the twin-screw extruder and may be appropriately selected, but in general, a rotation number of 20 to 150 rpm is employed.

In the final polymerization step, the relative viscosity [RV] as an index for the polymerization degree of polyamide is controlled. The relative viscosity [RV] of the obtained polyamide and the melt viscosity of polymer at the reactor outlet in the final polymerization step are correlated and therefore, the relative viscosity [RV] can be controlled by controlling the melt viscosity of polymer.

In the present invention, it is preferred to continuously measure the melt viscosity of a polymer at the outlet (45) of the final polymerization reactor by a viscometer (50) and feedback the measured results to the polymerization step conditions so that the measured viscosity value becomes a value within a previously set definite range.

The conditions in the polymerization step for controlling the melt viscosity of polymer include (1) the purged amount in an inactive gas purging operation inside the reactor, (2) the vacuum density in a vacuum operation in the reactor, and (3) the added amount in an addition operation of an end group adjusting agent into the reactor. These are described below.

The inert gas purging operation accelerates the polymerization reaction and at the same time, can control the melt viscosity by adjusting the purged amount. The inert gas purging is performed from the inert gas purging port (42). The purged amount with inert gas varies depending on the desired melt viscosity and polymerization conditions such as temperature, but the purged amount is preferably 10 L or less, for example, from 0.005 to 10 L, per 1 kg of the polymer. If the purged amount exceeds 10 L/kg, the amount of inert gas used becomes excessively large due to activity of accelerating the polymerization reaction and this causes cost rise. The purged amount is preferably from 0.005 to 9.5 L/kg, more preferably from 0.01 to 9 L/kg. In the case where the desired RV can be obtained even without the inert gas purging, it is also possible not to perform the purging (that is, the purged amount is 10 L/kg). The inert gas is not limited in the kind as long as it is inactive to the polyamide production reaction, but a nitrogen gas is advantageous in view of safety and cost.

The moisture percentage of the inert gas is 0.05 wt % or less and this is important. If the moisture percentage exceeds 0.05 wt %, the elevation of melt viscosity is retarded to adversely affect the productivity and also, the gelling is caused. The moisture percentage is preferably 0.03 wt % or less, more preferably 0.01 wt % or less. The oxygen concentration in the reaction atmosphere is preferably 0.1 wt % or less, more preferably 0.001 wt % or less.

The polymerization reaction can be accelerated also by a vacuum operation, and the reaction rate and melt viscosity can be controlled by adjusting the vacuum degree. This operation is performed through the vacuum port (43). The reaction of producing a polyamide is a condensation reaction between a carboxylic acid and an amine and by removing water produced, the polymerization reaction is accelerated. The vacuum degree applied in the final polymerization step varies depending on the desired melt viscosity and polymerization conditions but is from 150 to 1,200 hPa. If the vacuum degree is less than 150 hPa, vent-up of polymer or clogging of pipe may occur in the final polymerization step and stable operability cannot be expected, whereas if it exceeds 1,200 hPa, the vacuum degree is not so effective but rather the rate in achieving the desired melt viscosity becomes low to cause decrease in the productivity and depending on the case, the desired melt viscosity may not be achieved. The vacuum degree is preferably from 200 to 1,100 hPa, more preferably from 250 to 1,050 hPa.

On the other hand, the polymerization reaction can be suppressed by an operation of adding an end group adjusting agent such as acid anhydride compound, and the reaction rate and melt viscosity can be controlled by adjusting the amount added of the end group adjusting agent. This operation is performed through an addition port (44). It is considered that the amino end group of polymer is blocked by the addition of an acid anhydride compound and thereby the polymerization reaction can be suppressed. Examples of the acid anhydride compound include hexahydrophthalic anhydride (HOPA), phthalic anhydride, trimellitic anhydride, pyromellitic anhydride and succinic anhydride. Among these, HOPA is preferred in view of color tone of the polyamide. The amount added of the acid anhydride compound varies depending on the desired melt viscosity and is not particularly limited, but usually, the amount added is preferably 150 meq/kg or less. If the amount added exceeds 150 meq/kg, the polymerization rate may be decreased or vent-up may be caused and the operation stability is worsened. Furthermore, the unreacted acid anhydride compound remains in the polymer and gives rise to reduction in the quality of polyamide.

The melt viscosity of the polymer is preferably controlled by performing only the inert gas purging operation alone out of the inert gas purging operation, the vacuum operation and the addition operation of an end group adjusting agent, or performing two or more operations out of these three operations.

If the vacuum operation or addition operation of an end group adjusting agent is performed alone, the following bad effects are liable to occur and this is not preferred. For example, if the fluctuation of vacuum degree becomes excessively large, the residence amount of polymer in the polymerization vessel is varied due to change in the holdup brought about by bubbling and generation of contamination, change in the residence time or the like is caused, as a result, a polyamide having an intended quality can be hardly obtained. Also, if the fluctuation in the amount added of the end group adjusting agent becomes too large, the obtained polyamide disadvantageously has a dispersion in the end group concentration.

Therefore, the melt viscosity of the polymer can be stably controlled while preventing occurrence of these bad effects, by using a method of performing only the inactive gas purging operation alone and automatically controlling the purged amount or by using two or three operations in combination out of the inert gas purging operation, the vacuum operation and the addition operation of an end group adjusting agent, and automatically controlling at least one operation amount in the operations performed.

In the present invention, when two operations selected from those described above are performed, it is preferred that one operation amount out of two operation amounts is set as a fixed value and the other one operation amount is automatically controlled.

In the present invention, when those three operations all are performed, it is preferred that two operation amounts out of three operation amounts are each set as a fixed value and only the remaining one operation amount is automatically controlled or that only one operation amount out of three operation amounts is set as a fixed value and the other two operation amounts are automatically controlled.

Among these methods, the method to be employed may be appropriately selected by taking account of the kind of polyamide intended to produce and the objective polymerization degree.

A preferred method is to perform the vacuum operation without performing the addition operation of an end group adjusting agent and automatically control the inert gas purged amount as a variation while setting constant the vacuum degree. This method is advantageous in that the production of a polyamide with high polymerization degree unachievable by performing only the inert gas purging alone or vacuum degree alone is facilitated and the vacuum degree can be kept at a constant value not in an excessively high region by purging with an inert gas, thereby eliminating a risk of bringing about vent-up due to excessively high vacuum degree.

In this case, the conditions are preferably such that the vacuum degree is a constant value in the range from 400 to 1,150 hPa and the inert gas purged amount is automatically controlled in the range from 0.005 to 9.5 L/kg, more preferably such that the vacuum degree is a constant value in the range from 450 to 1,100 hPa and the inert gas purged amount is automatically controlled in the range from 0.01 to 9 L/kg. If the inert gas purged amount is less than 0.005 L/kg or the vacuum degree exceeds 1,150 hPa, the polymerization rate decreases, whereas if the inert gas purged amount exceeds 9.5 L/kg or the vacuum degree is less than 400 hPa, this is disadvantageous in that, for example, the amount of the inert gas used increases to bring about cost rise or the polymerization rate decreases to cause reduction in the productivity.

Another preferred method is to perform all of the addition operation of an end group adjusting agent, the vacuum operation and the inert gas purging operation and automatically control the inert gas purged amount as a variation while setting constant the amount added of an end group adjusting agent and the vacuum degree. By previously determining the amount added of an end group adjusting agent, the end group concentration of the produced polyamide can be adjusted to a desired degree.

In this case, the conditions are preferably such that the vacuum degree is a constant value in the range from 400 to 1,150 hPa, the amount of end group adjusting agent is a constant value in the range from 5 to 150 meq/kg, and the inert gas purged amount is automatically controlled in the range from 0.005 to 9.5 L/kg, more preferably such that the vacuum degree is a constant value in the range from 450 to 1,100 hPa, the amount of end group adjusting agent is a constant value in the range from 10 to 140 meq/kg, and the inert gas purged amount is automatically controlled in the range from 0.01 to 9 L/kg.

Figure 2:
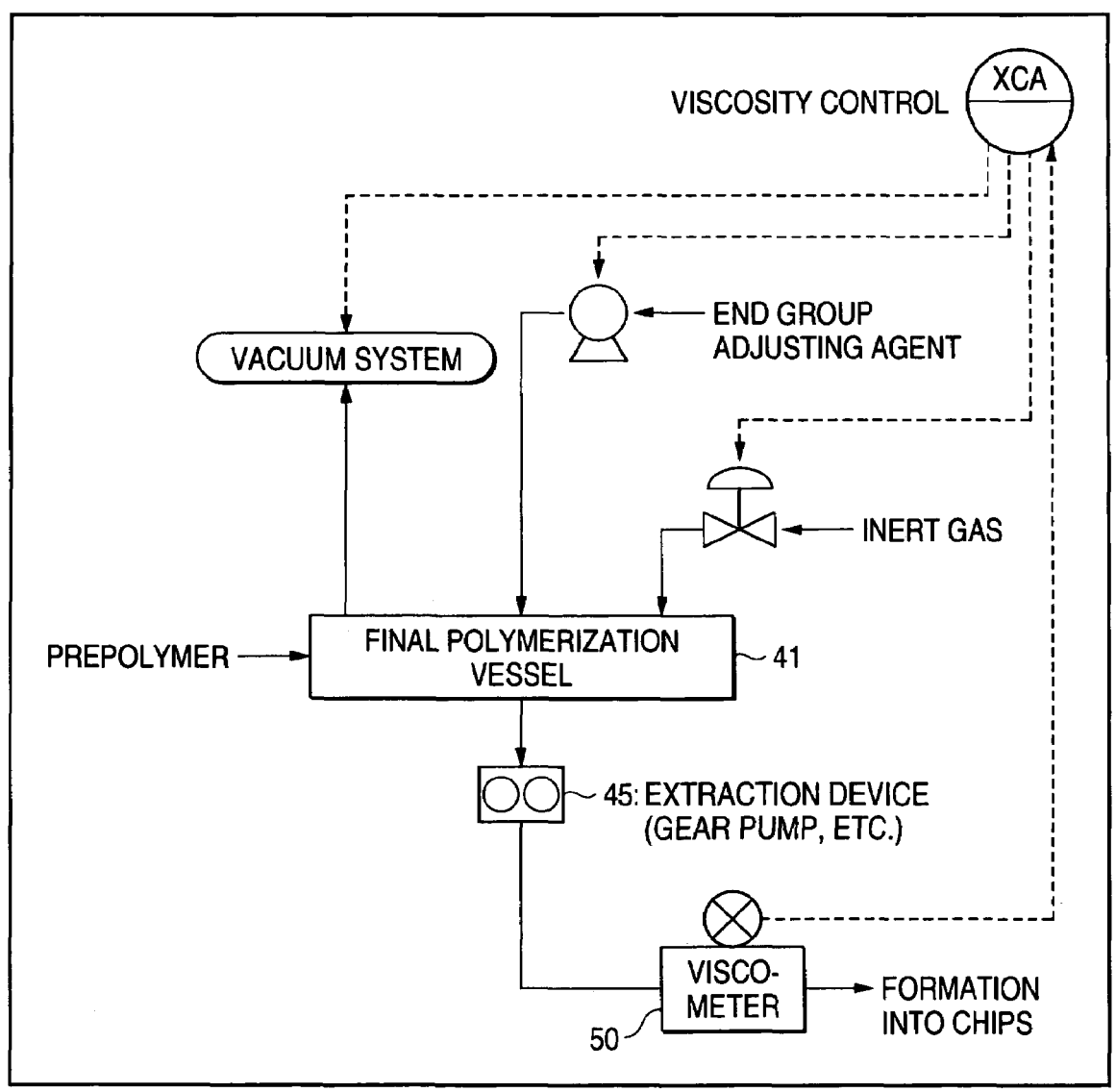
FIG. 2 is a conceptual view of the system for automatically controlling the operation amount in the present invention.

FIG. 2 is a conceptual view of the system for automatically controlling the operation amount. The melt viscosity of polymer continuously discharged from the outlet (45) of the final polymerization reactor is continuously measured by a viscometer (50). The measured viscosity value is sent to the viscosity control unit XCA. In the viscosity control unit XCA, the viscosity value is previously set in a definite range and also, for example, which operation amount is used, which operation amount out of operation amounts used is set as a fixed value, and which operation amount is automatically controlled as a variation are set. The viscosity control unit XCA feeds a control signal to a system to be automatically controlled out of the inert gas purging system, the vacuum system and the addition system of end group adjusting agent, and automatically control the system. When the melt viscosity of the polymer is estimated to come short of the set definite range, the system is controlled to increase the inert gas purged amount, elevate the vacuum degree or decrease the amount added of an end group adjusting agent, so as to accelerate the polymerization reaction. On the other hand, when the melt viscosity is estimated to exceed the set definite range, the system is controlled to decrease the inert gas purged amount, decrease the vacuum degree or increase the amount added of an end group adjusting agent, so as to suppress the polymerization reaction. In this way, a polymer having a melt viscosity in a definite range can be continuously produced.

The viscometer (50) may be a conventionally known viscometer such as capillary viscometer and vibratory viscometer, but in view of facilitated maintenance and control in the continuous production, a vibratory viscometer is preferred.

As an index for knowing how exactly the automatic control of melt viscosity is performed, a standard deviation [$\sigma$] on the relative viscosity [RV] of the polyamide sampled in aging can be used. In order to assure the stabilized quality of polyamide, [$\sigma$] is preferably 0.12 or less, more preferably 0.09 or less.

For example, in the case of a polyamide mainly comprising ADA-MXD, the [RV] is preferably controlled by the combination of inert gas purging and vacuum degree. This method is advantageous in that the production of a polyamide with high [RV] unachievable by performing only the inert gas or vacuum degree alone is facilitated and [RV] can be controlled in a constant vacuum degree by adjusting the inert gas purged amount or in a constant inert gas amount by adjusting the vacuum degree, thus assuring more flexible control of [RV].

The conditions are preferably such that the inert gas purged amount is from 0.005 to 9.5 L/kg and the vacuum degree is from 200 to 1,150 hPa, more preferably such that the inert gas purged amount is from 0.01 to 9 L/kg and the vacuum degree is from 250 to 1,100 hPa. If the inert gas purged amount is less than 0.005 L/kg or the vacuum degree exceeds 1,150 hPa, the polymerization rate decreases, whereas if the inert gas purged amount exceeds 9.5 L/kg or the vacuum degree is less than 200 hPa, this is disadvantageous in that, for example, the amount of the inert gas used increases to bring about cost rise or the polymerization rate decreases to cause reduction in the productivity.

The control method for [RV] is not limited to those described above, and addition of an alkali metal compound or conventionally known various techniques may be employed.

EXAMPLES

The present invention is described in greater detail below by referring to Examples, but the present invention is not limited to these Examples.

[Measurement of Parameters]

1. The shear rate ($\gamma$) and shear stress ($\tau$) were determined according to the following formula:

$$\gamma(1/sec)=8U/D$$

wherein U is a flow rate (cm/sec) and D is an inner diameter (cm) of tube;

$$\tau(Pa)=\mu\cdot\gamma$$

wherein $\mu$ is a melt viscosity (Pa·sec) and this was on-line measured by a vibratory viscometer of MANSCO disposed at the inlet of the amidation step.

2. Relative Viscosity [RV]

A polyamide (0.25 g) was dissolved in 25 ml of 96% sulfuric acid and the relative viscosity was determined from the ratio in the falling rate between the 96% sulfuric acid and the polyamide resin solution measured with use of an Ostwald viscosity tube in a constant temperature bath kept at 20° C.

3. Color Tone [Co-b]

Polyamide resin chips (10 g) were uniformly filled in a cell and the color tone was measured by Color Meter Model 1001DP manufactured by Nippon Denshoku Industries Co., Ltd.

4. Composition of Polyamide

A polyamide resin was dissolved in hexafluoroiso-propanol and the composition was determined with use of Unity-500 NMR Spectroscope manufactured by Varian.

5. Water Absorption Percentage of Polyamide

A 10 cm-square polyamide shaped plate with a thickness of 2 mm was vacuum-dried at 100° C. for 24 hours, immediately allowed to cool in a desiccator containing silica gel and then taken out, and the dry weight ($W_1$) was measured. Thereafter, the shaped plate was dipped in distilled water at 80° C. for 24 hours and after completely wiping off the water adhering to the surface, the weight ($W_2$) after water absorption treatment was measured. The water absorption percentage (%) was determined according to the following formula:

$$\text{Water absorption percentage (\%)}=[(W_2)-(W_1))/(W_1)]\times 100$$

6. Amino End Group Concentration [AEG]

A polyamide resin sample (0.6 g) was dissolved in 50 ml of phenol/ethanol (volume ratio: 4/1). Subsequently, 20 ml of water/ethanol (volume ratio: 3/2) was added was added thereto and one droplet of indicator methyl orange was added. The resulting solution was titrated with an aqueous ethanolic hydrochloric acid solution (prepared by adding distilled water to 100 ml of 1/10N HCl and 50 ml of ethanol to made 500 ml) and the amino end group concentration [AEG] was calculated according to the following formula:

$$\text{AEG (meq/kg)}=\{[(A-B)\times N\times f]/(w\times 1000)\}\times 10^6$$

A: titration value (ml)
B: blank titration value of solvent (ml)
N: concentration (mol/liter) of ethanolic HCl
f: factor of ethanolic HCl
w: weight (g) of sample 7. Carboxyl End Group Concentration [CEG]

Benzyl alcohol (10 ml) was added to 0.2 g of a polyamide resin sample and the sample was dissolved at 205±5° C. for 5 minutes. The resulting solution was cooled in water for 15 seconds and after adding phenol phthalein as an indicator, titrated with an ethanolic potassium hydroxide solution (prepared by adding ethanol to 80 ml of 0.5N-KOH to make 1,000 ml), and the carboxyl end group concentration [CEG] was calculated according to the following formula:

$$\text{CEG (meq/kg)}=\{[(A-B)\times N\times f]/(w\times 1000)\}\times 10^6$$

A: titration value (ml)
B: blank titration value of solvent (ml)
N: concentration (mol/liter) of ethanolic potassium hydroxide
f: factor of ethanolic potassium hydroxide
w: weight (g) of sample

[Automatic Control of Melt Viscosity]

The melt viscosity was on-line measured by a vibratory viscometer (50) (TOV2079) of MANSCO disposed at the outlet of the final polymerization vessel. The operations were automatically controlled through a viscosity control unit XCA by using an automatic on-off valve disposed in the leak part of vacuum line in the case of vacuum degree, or by the frequency of the supply pump (HYM-1-010-51, manufactured by Fuji Techno Industries Corp.) in the case of end group adjusting agent.

Example 1

A polyamide prepolymer ([RV]:1.61) mainly comprising adipic acid and m-xylylenediamine was supplied to reactor SCR conditioned to a reaction temperature of 255° C., an atmospheric pressure (no vacuum operation) and a screw rotation number of 50 rpm, thereby performing the final polymerization. Based on the indicated value of the melt viscometer, the purged amount with nitrogen gas (purity: 99.999% or more) was automatically controlled. with an average residence time of 10 minutes in SCR, a polyamide resin having an average [RV] value of 2.37 and a standard deviation [$\sigma$] of 0.02 was obtained. The average [RV] value and standard deviation [$\sigma$] were calculated from the results obtained by measuring 20 samples extracted at intervals of 10 minutes or more.

Example 2

The same procedure as in Example 1 was preformed except for setting the vacuum degree in the reactor SCR to a fixed value of 865 hPa. The obtained polyamide resin had an average [RV] value of 2.38 and a standard deviation [$\sigma$] of 0.01.

Example 3

A polyamide prepolymer ([RV]:1.65) mainly comprising adipic acid, m-xylylenediamine and terephthalic acid was supplied to reactor SCR conditioned to a temperature of 255° C., a vacuum degree of 860 hPa (fixed value), a nitrogen gas (purity: 99.999% or more) purged amount of 0.38 L/kg (fixed value) and a screw rotation number of 50 rpm, thereby performing the final polymerization. With passing of about 1.5 minutes after the addition of the prepolymer to SCR, hexahydrophthalic anhydride (HOPA) was added. The amount added of HOPA was automatically controlled based on the indicated value of the melt viscometer. With an average residence time of 10 minutes, a polyamide resin having an average [RV] value of 2.41 and a standard deviation [σ] of 0.02 was obtained.

Comparative Example 1

The same procedure as in Example 1 was preformed except for performing no nitrogen gas purging in the reactor SCR and controlling the melt viscosity by automatic control using the vacuum degree. The obtained polyamide had an average [RV] value of 2.37, but the standard deviation [σ] was as large as 0.32 and the contamination was also large.

Comparative Example 2

The same procedure as in Example 3 was preformed except for setting the vacuum degree in the reactor SCR to atmospheric pressure (1,013 hPa) and performing no nitrogen gas purging. The obtained polyamide had an average [RV] value of 2.00, but the standard deviation [σ] was 0.14 revealing large dispersion. The dispersion of the end group concentration was also large and the quality was not satisfied.

Comparative Example 3

The same procedure as in Example 1 was preformed except for using no melt viscometer and setting the nitrogen gas purged amount in the reactor SCR to a fixed value (3.38 L/kg). The obtained polyamide resin had an average [RV] value of 2.10, but the standard deviation [σ] was 0.32, revealing large dispersion.

Comparative Example 4

The same procedure as in Example 1 was preformed except for using a horizontal twin-screw reaction apparatus with no self-cleaning property in place of the reactor SCR. The obtained polyamide resin had an average [RV] value of 2.00, but the standard deviation [σ] was 0.35, revealing large dispersion. Also, the contamination was large as compared with Example 1 and the quality was not satisfied.

Example 4

By referring to FIG. 1, 25 kg of powdery adipic acid (ADA) and 18 kg of m-xylylenediamine (MXD) were supplied to the melting tank (11) and the melting tank (13), respectively. In each of the melting tanks (11) and (13), an operation of keeping a vacuum degree of 40 hPa for 5 minutes and then creating an atmospheric pressure with nitrogen gas was repeated three times. Thereafter, ADA and MXD were heated at 180° C. and 60° C., respectively, under a nitrogen pressure of 0.2 MPa to obtain respective melted liquids. Subsequently, ADA and MXD were transferred to the storage tank (12) and the storage tank (14), respectively.

The melted raw materials ADA and MXD were supplied by plunger pumps (15) and (16) (both, Model HYSA-JS-10, manufactured by Fuji Techno Industries Corp.), respectively, to the tubular reaction apparatus (L/D=780) (21) for the amidation step at a ratio of giving an equimolar ratio. At this time, as for the mass flow rates of ADA and MXD, the outputs of the plunger pumps (15) and (16) were automatically controlled by the control unit (19) so that the mass flowmeters (17) and (18) (both, Model CN003D-SS-200R, Coriolis-type flowmeter, manufactured by Oval Corporation) disposed immediately after the plunger pumps (15) and (16) could show indicated values of 4.75 kg/hr and 4.42 kg/hr, respectively.

The average residence time in the amidation step was 35 minutes. The reaction conditions in the amidation step were such that the inner temperature at the inlet (22) was 180° C., the inner temperature at the outlet (23) was 255° C., and the inner pressure was 0.7 MPa. The shear rate γ at the inlet (22) of the amidation step was 3.1 (1/sec) and the shear stress τ was $9.3 \times 10^{-4}$ Pa. The difference ARV between the relative viscosity [RV] at the inlet (22) of the amidation step and the [RV] at the outlet (23) was 0.22.

The reaction mixture passed through the amidation step was supplied to the vertical stirring tank (31) for the initial polymerization step conditioned to an inner temperature of 255° C., an inner pressure of 0.7 MPa and a stirring at 30 rpm. The reaction mixture was allowed to stay for 50 minutes under the same conditions and simultaneously, the condensed water was removed by distillation. The reaction product passed through the initial polymerization step was supplied to SCR (41) conditioned to a reaction temperature of 255° C., a screw rotation number of 50 rpm and an atmospheric pressure (no vacuum operation), and the nitrogen gas (purity: 99.999% or more) purged amount was automatically controlled by the indicated value of the melt viscometer (50). With an average residence time of 10 minutes in SCR, a polyamide resin having an average [RV] value of 2.06 and a standard deviation [σ] of 0.02 was obtained.

The results in Examples 1 to 4 and Comparative Examples 1 to 4 are shown in Table 1.

TABLE 1

|  | | | Production Conditions Final Polymerization Vessel | | | Polymer Properties [RV] | | |
| --- | --- | --- | --- | --- | --- | --- | --- | --- |
|  | Composition of Polyamide | Prepolymer [RV] (−) | N₂ Purged Amount (L/kg) | Vacuum Degree (hPa) | Amount Added of HOPA (meq/kg) | Average Value (−) | Standard Deviation (−) | Remarks |
| Example 1 | SM | 1.61 | automatic control | atmospheric pressure | none | 2.37 | 0.02 |  |
| Example 2 | SM | 1.61 | automatic control | 865 | none | 3.38 | 0.01 |  |

TABLE 1-continued

| | Composition of Polyamide | Prepolymer [RV] (—) | Production Conditions Final Polymerization Vessel | | | Polymer Properties [RV] | | Remarks |
|---|---|---|---|---|---|---|---|---|
| | | | N₂ Purged Amount (L/kg) | Vacuum Degree (hPa) | Amount Added of HOPA (meq/kg) | Average Value (—) | Standard Deviation (—) | |
| Example 3 | SMT | 1.65 | 0.38 | 865 | automatic control | 2.41 | 0.02 | |
| Comparative Example 1 | SM | 1.61 | — | automatic control | none | 2.38 | 0.32 | large contamination |
| Comparative Example 2 | SMT | 1.65 | — | atmospheric pressure | automatic control | 2.00 | 0.14 | large dispersion of end group concentration |
| Comparative Example 3 | SM | 1.61 | 3.38 | atmospheric pressure | none | 2.10 | 0.32 | |
| Comparative Example 4 | SM | 1.61 | automatic control | atmospheric pressure | none | 2.00 | 0.35 | large contamination |
| Example 4 | SM | — | automatic control | atmospheric pressure | none | 2.06 | 0.02 | continuously performed from raw material preparation |

SM: Adipic acid//m-Xylylenediamine
SMT: Adipic acid/Terephthalic acid//m-Xylylenediamine Example 5

Powdery adipic acid (ADA) (25 kg) and 18 kg of m-xylylenediamine (MXD) were supplied to the melting tank (11) and the melting tank (13), respectively. In each of the melting tanks (11) and (13), an operation of keeping a vacuum degree of 40 hPa for 5 minutes and then creating an atmospheric pressure with nitrogen gas was repeated three times. Thereafter, ADA and MXD were heated at 180° C. and 60° C., respectively, under a nitrogen pressure of 0.2 MPa to obtain respective melted liquids. Subsequently, ADA and MXD were transferred to the storage tank (12) and the storage tank (14), respectively.

The melted raw materials ADA and MXD were supplied by plunger pumps (15) and (16), respectively, to the tubular reaction apparatus (L/D=780) (21) for the amidation step at a ratio of giving an equimolar ratio. At this time, the supply amount was adjusted so that the average residence time in the amidation step could be 35 minutes. The reaction conditions in the amidation step were such that the inner temperature at the inlet (22) was 180° C., the inner temperature at the outlet (23) was 255° C., and the inner pressure was 0.7 MPa. The shear rate γ at the inlet (22) of the amidation step was 3.1 (1/sec) and the shear stress τ was 9.3×10⁻⁴ Pa. The difference ARV between the relative viscosity [RV] at the inlet (22) of the amidation step and the [RV] at the outlet (23) was 0.22.

The reaction mixture passed through the amidation step was supplied to the vertical stirring tank (31) for the initial polymerization step conditioned to an inner temperature of 255° C., an inner pressure of 0.7 MPa and a stirring at 30 rpm. The reaction mixture was allowed to stay for 50 minutes under the same conditions and simultaneously, the condensed water was removed by distillation. The reaction product passed through the initial polymerization step was supplied to SCR (41) conditioned to a reaction temperature of 255° C., a vacuum degree of 1,013 hPa, a nitrogen gas purged amount of 1.13 L/kg and a screw rotation number of 50 rpm. With an average residence time of 10 minutes, a polyamide resin having [RV] of 2.06 and [Co-b] of 0.2 was obtained.

Examples 6 and 7

The same procedure as in Example 5 was performed except for changing the L/D by lengthening the extension distance of the tubular reaction apparatus (21) for the amidation step, and changing the amount of raw material supplied to the reaction apparatus (21). The results are shown in Tables 2 and 3.

Example 8

Salt Forming Method

In the raw material salt forming tank, 10.267 kg of terephthalic acid (TPA), 11.104 kg of an aqueous 64.7 wt % hexamethylenediamine (HMDA) solution, 14.052 kg of caprolactam (CLM) and 9.577 kg of water were added. Then, after keeping a vacuum and creating an atmospheric pressure with nitrogen gas similarly to Example 5, nitrogen purging at a nitrogen pressure of 0.22 MPa was performed three times. Thereafter, a 70 wt % solution of aminocarboxylate was prepared with stirring at 135° C. under a nitrogen pressure of 0.22 MPa, and the prepared solution was transferred to the storage tank.

The aqueous aminocarboxylate solution was supplied by the plunger pump to the tubular reaction apparatus (L/D=780) for the amidation step. The tubular reaction apparatus was conditioned such that the inner temperature was from 135° C. (inlet) to 255° C. (outlet) and the inner pressure was from 0.22 to 2 MPa. The average residence time was about 20 minutes. The shear rate γ at the inlet of the amidation step was 5.35 (1/sec) and the shear stress τ was 10.7×10⁻⁴ Pa. The difference ARV between the relative viscosity [RV] at the inlet of the amidation step and the [RV] at the outlet was 0.25.

The reaction product passed through the amidation step was transferred to the vertical stirring tank for the initial polymerization step conditioned to 2 MPa and 285° C., and water produced by the reaction with stirring at 30 rpm for 30 minutes and water used for the adjustment of salt concentration were removed by distillation to obtain an initial polymerization product.

The obtained initial polymerization product was supplied to SCR conditioned to a temperature of 285° C., a vacuum degree of 860 hPa and a screw rotation number of 70 rpm, thereby performing the final polymerization. With passing of about 1.5 minutes after the supply of the initial polymerization product to SCR, hexahydrophthalic anhydride (HOPA) was added. The frequency of the plunger pump was set so that the amount added of HOPA could be 45 meq/kg per 1 kg of the polymer. With an average residence time of about 9 minutes in SCR, a polyamide having [RV] of 2.14 and [Co-b] of 2.1 was obtained.

Example 9

Salt Forming Method

The same procedure as in Example 8 was performed except for changing the L/D by lengthening the extension distance of the tubular reaction apparatus (21) for the amidation step.

The production conditions for polyamides in Examples 5 and 9 are shown in Table 2 and the properties of each polyamide obtained are shown in Table 3. In all Examples, the operation was good and a polyamide having excellent physical property values was obtained.

and 60° C., respectively, under a nitrogen pressure of 0.2 MPa to obtain respective melted liquids. Subsequently, ADA and MXD were transferred to the storage tank (12) and the storage tank (14), respectively.

The melted raw materials ADA and MXD were supplied by plunger pumps (15) and (16) (both, Model HYSA-JS-10, manufactured by Fuji Techno Industries Corp.), respectively, to the tubular reaction apparatus (L/D=780) (21) for the amidation step each in a constant amount. As for the mass flow rates of ADA and MXD, the outputs of the plunger pumps (15) and (16) were automatically controlled by the control unit (19) so that the mass flowmeters (17) and (18) (both, Model CN003D-SS-200R, Coriolis-type flowmeter, manufactured by Oval Corporation) disposed immediately after the plunger pumps (15) and (16) could show indicated values of 4.75 kg/hr and 4.42 kg/hr, respectively. The reaction conditions in the amidation step were such that the inner temperature at the inlet (22) was 180° C., the inner temperature at the outlet (23) was 255° C., the inner pressure was 0.7 MPa, and the average residence time was 30 minutes.

TABLE 2

|  |  | Example 5 | Example 6 | Example 7 | Example 8 | Example 9 |
|---|---|---|---|---|---|---|
| Composition of polyamide |  | MA | MA | MA | HCT | HCT |
| Raw material preparation step | Oxygen removing method (vacuum degree × times, nitrogen pressure) | 40 hPa × 3 + 0.2 MPa | 40 hPa × 3 + 0.2 MPa | 40 hPa × 3 + 0.2 MPa | 40 hPa × 3 + 0.22 MPa | 40 hPa × 3 + 0.22 MPa |
|  | Oxygen concentration (ppm) | 4 | 4 | 4 | 4 | 4 |
| Amidation step | L/D | 780 | 1320 | 1320 | 780 | 1320 |
|  | Average residence time (min) | 35 | 57 | 38 | 20 | 35 |
|  | γ (1/sec) | 3.10 | 3.10 | 4.65 | 5.35 | 5.35 |
|  | τ (×10$^{-4}$ Pa) | 9.3 | 9.3 | 14.0 | 10.7 | 10.7 |
|  | ΔRV | 0.22 | 0.24 | 0.24 | 0.25 | 0.25 |
| Later polymerization step | N$_2$ Purged amount (L/kg) | 1.13 | 1.13 | 1.13 | 0 | 0 |
|  | Vacuum degree (hPa) | 1013 | 1013 | 1013 | 860 | 860 |
|  | Amount added of HOPA (meq/kg) | 0 | 0 | 0 | 45 | 45 |

MA: ADA//MXD = 100//100 (mol %)
HCT: TPA/CLM//HMDA = 35/65//100 (mol %)

TABLE 3

|  | Example 5 | Example 6 | Example 7 | Example 8 | Example 9 |
|---|---|---|---|---|---|
| [RV](−) | 2.06 | 2.02 | 1.90 | 2.14 | 2.15 |
| [Co-b](−) | 0.2 | 1.0 | 0.4 | 2.1 | 2.1 |
| Water absorption percentage (%) | 5.4 | 5.4 | 5.2 | 6.3 | 6.3 |

Example 10

Powdery adipic acid (ADA) (25 kg) and 18 kg of m-xylylenediamine (MXD) were supplied to the melting tank (11) and the melting tank (13), respectively. In each of the melting tanks (11) and (13), an operation of keeping a vacuum degree of 40 hPa for 5 minutes and then creating an atmospheric pressure with nitrogen gas was repeated three times. Thereafter, ADA and MXD were heated at 180° C.

The reaction mixture passed through the amidation step was supplied to the vertical stirring tank (31) for the initial polymerization step conditioned to an inner temperature of 255° C., an inner pressure of 0.7 MPa and a stirring at 30 rpm. The reaction mixture was allowed to stay for 50 minutes under the same conditions and simultaneously, the condensed water was removed by distillation. The reaction product passed through the initial polymerization step was supplied to SCR (41) conditioned to a reaction temperature of 255° C., a vacuum degree of 1,013 hPa, a nitrogen gas purged amount of 1.13 L/kg and a screw rotation number of 50 rpm. After passing of an average residence time of 10 minutes, the polyamide was continuously ejected. The polyamide was sampled 5 times at intervals of 30 minutes and the polyamides sampled were measured for [RV], [AEG] and [CEG]. The average value, standard deviation and range (difference between maximum value and minimum value in polyamides sampled 5 times) of each of [RV], [AEG] and [CEG] are shown in Table 4.

Example 11

The same procedure as in Example 10 was performed except for changing the set mass flow rates of ADA and MXD to 4.63 kg/hr and 4.27 kg/hr, respectively.

Example 12

Powdery adipic acid (ADA) (25 kg) and 18 kg of liquid hexamethylenediamine (HMD) were supplied to the melting tank (11) and the melting tank (13), respectively. In each of the melting tanks (11) and (13), an operation of keeping a vacuum degree of 40 hPa for 5 minutes and then creating an atmospheric pressure with nitrogen gas was repeated three times. Thereafter, ADA and HMD were heated at 180° C. and 60° C., respectively, under a nitrogen pressure of 0.2 MPa to obtain respective melted liquids. Subsequently, ADA and HMD were transferred to the storage tank (12) and the storage tank (14), respectively.

The melted raw materials ADA and HMD were supplied by plunger pumps (15) and (16) (the same as those used in Example 1), respectively, to the tubular reaction apparatus (L/D=780) (21) for the amidation step each in a constant amount. As for the mass flow rates of ADA and HMD, the outputs of the plunger pumps (15) and (16) were automatically controlled by the control unit (19) so that the mass flowmeters (17) and (18) (the same as those used in Example 10) disposed immediately after the plunger pumps (15) and (16) could show indicated values of 4.25 kg/hr and 3.38 kg/hr, respectively. The reaction conditions in the amidation step were such that the inner temperature at the inlet (22) was 180° C., the inner temperature at the outlet (23) was 270° C., the inner pressure was 1.0 MPa, and the average residence time was 30 minutes.

The reaction mixture passed through the amidation step was supplied to the vertical stirring tank (31) for the initial polymerization step conditioned to an inner temperature of 270° C., an inner pressure of 1.0 MPa and a stirring at 30 rpm. The reaction mixture was allowed to stay for 50 minutes under the same conditions and simultaneously, the condensed water was removed by distillation. The reaction product passed through the initial polymerization step was supplied to SCR (41) conditioned to a reaction temperature of 270° C., a vacuum degree of 1,013 hPa, a nitrogen gas purged amount of 0.3 L/kg and a screw rotation number of 50 rpm. After passing of an average residence time of 10 minutes, the polyamide was continuously ejected. The polyamide was sampled 5 times at intervals of 30 minutes and the polyamides sampled were measured for [RV], [AEG] and [CEG].

Example 13

The same procedure as in Example 10 was performed except for once adjusting the outputs of the plunger pumps (15) and (16) so that the mass flowmeters (17) and (18) of ADA and MXD could show indicated values of 4.75 kg/hr and 4.42 kg/hr, respectively, and keeping constant the as-adjusted outputs of the pumps (15) and (16) without automatically controlling the outputs of the pumps (15) and (16) by using the indicated values of the mass flowmeters (17) and (18) and using the control unit (19).

Example 14

The same procedure as in Example 10 was performed except for changing the flowmeter from the mass flowmeter to the volume flowmeter and automatically controlling the outputs of the plunger pumps (15) and (16) by the control unit (19) so that the volume flowmeters of ADA and MXD could show indicated values of 5.23 L/hr and 4.62 L/hr, respectively.

TABLE 4

| | | | Example 10 | Example 11 | Example 12 | Example 13 | Example 14 |
|---|---|---|---|---|---|---|---|
| Raw Materials | | | ADA/MXD | ADA/MXD | ADA/HMD | ADA/MXD | ADA/MXD |
| Production Conditions (set value of flow rate) | Dicarboxylic acid | | 4.75 kg/hr | 4.63 kg/hr | 4.25 kg/hr | — | 5.23 L/hr |
| | Diamine | | 4.42 kg/hr | 4.27 kg/hr | 3.38 kg/hr | — | 4.62 L/hr |
| Polymer Properties | [RV] (−) | Average value | 2.26 | 2.23 | 1.91 | 1.84 | 2.13 |
| | | Standard deviation | 0.04 | 0.03 | 0.04 | 0.13 | 0.08 |
| | | Range | 0.15 | 0.08 | 0.14 | 0.36 | 0.34 |
| | [AEG] (meq/kg) | Average value | 73.1 | 45.9 | 62.5 | 56.7 | 72.8 |
| | | Standard deviation | 6.2 | 6.7 | 6.8 | 32.5 | 10.9 |
| | | Range | 17.7 | 20.4 | 18.2 | 98.3 | 41.5 |
| | [CEG] (meq/kg) | Average value | 67.2 | 90.7 | 72.3 | 155.9 | 72.9 |
| | | Standard deviation | 7.0 | 5.4 | 7.9 | 65.5 | 19.5 |
| | | Range | 22.5 | 12.9 | 24.8 | 207.6 | 76.4 |

Production conditions of polyamides in Examples 10 to 14 and the properties of each polyamide obtained are shown in Table 4. In Examples 10 to 12, the operation was good and a polyamide having very homogeneous physical properties was obtained. As seen from Examples 10 and 11, a polyamide having objective properties could be very homogeneously produced depending on setting of the supply mass flow rates of ADA and MXD.

On the other hand, in Example 13, despite the same mass flow rates in supplying raw materials, the obtained polyamide underwent large fluctuation of physical properties in aging. This is considered to result because when the flow rates in supplying raw materials are set only by the outputs of plunger pumps, ADA and MXD cannot be supplied each at a constant mass flow rate at all times and the mol balance between ADA and MXD is fluctuated.

In Example 14, the outputs of plunger pumps were automatically controlled by the control unit, nevertheless, the obtained polyamide underwent large fluctuation of physical properties as compared with Examples 10 and 11. That is, the control by the volume flowmeter was not so exact as that by the mass flowmeter.

It is revealed from the results in Examples 10 to 14 that two melted raw materials are preferably supplied by using a mass flow meter.

Example 15

Salt Forming Method

In the raw material salt forming tank, 1.111 kg of terephthalic acid (TPA), 7.771 kg of m-xylylenediamine (MXD), 8.797 kg of adipic acid (ADA) and 17.679 kg of water were added. Then, nitrogen purging at a nitrogen pressure of 0.2 MPa was performed three times. Thereafter, a 50 wt % solution of aminocarboxylate was prepared with stirring at 135° C. under a nitrogen pressure of 0.2 MPa, and the prepared solution was transferred to the storage tank.

The aqueous aminocarboxylate solution was supplied by the plunger pump to the tubular reaction apparatus (L/D=780) for the amidation step. The tubular reaction apparatus was conditioned such that the inner temperature was from 135° C. (inlet) to 265° C. (outlet) and the inner pressure was from 0.22 to 2.5 MPa. The average residence time was about 35 minutes. The shear rate γ at the inlet of the amidation step was 3.10 (1/sec) and the shear stress τ was $6.2 \times 10^{-4}$ Pa. The difference ARV between the relative viscosity [RV] at the inlet of the amidation step and the [RV] at the outlet was 0.25.

The reaction product passed through the amidation step was transferred to the vertical stirring tank for the initial polymerization step conditioned to 2.5 MPa and 265° C., and water produced by the reaction with stirring at 30 rpm for 30 minutes and water used for the adjustment of salt concentration were removed by distillation to obtain an initial polymerization product.

The obtained initial polymerization product was supplied to SCR conditioned to a temperature of 265° C. and a screw rotation number of 50 rpm, thereby performing the final polymerization. The vacuum degree was automatically controlled by the indexed value of the melt viscometer. With an average residence time of 10 minutes in SCR, a polyamide resin in which the average [RV] value was 2.10 and the standard deviation [σ] of [RV] was 0.02 was obtained.

Example 16

Powdery adipic acid (ADA) (25 kg) and 20 kg of flaked hexamethylenediamine (HMDA) were supplied to the melting tank (11) and the melting tank (13), respectively. In each of the melting tanks (11) and (13), an operation of keeping a vacuum degree of 40 hPa for 5 minutes and then creating an atmospheric pressure with nitrogen gas was repeated three times. Thereafter, ADA and HMDA were heated at 180° C. and 60° C., respectively, under a nitrogen pressure of 0.2 MPa to obtain respective melted liquids. Subsequently, ADA and HMDA were transferred to the storage tank (12) and the storage tank (14), respectively.

The melted raw materials ADA and HMDA were supplied by plunger pumps (15) and (16), respectively, to the tubular reaction apparatus (L/D=780) (21) for the amidation step each in a constant amount. At this time, as for the mass flow rates of ADA and HMDA, the outputs of the plunger pumps (15) and (16) were automatically controlled by the control unit (19) so that the mass flowmeters (17) and (18) (both, Model CN003D-SS-200R, Coriolis-type flowmeter, manufactured by Oval Corporation) disposed immediately after the plunger pumps (15) and (16) could indicate the values shown in Table 5, respectively.

The average residence time in the amidation step was 35 minutes. The reaction conditions in the amidation step were such that the inner temperature at the inlet (22) was 180° C., the inner temperature at the outlet (23) was 270° C., and the inner pressure was 0.7 MPa. The shear rate γ at the inlet (22) of the amidation step was 3.1 (1/sec) and the shear stress τ was $9.0 \times 10^{-4}$ Pa. The difference ARV between the relative viscosity [RV] at the inlet (22) of the amidation step and the [RV] at the outlet (23) was 0.23.

The reaction mixture passed through the amidation step was supplied to the vertical stirring tank (31) for the initial polymerization step conditioned to an inner temperature of 270° C., an inner pressure of 0.7 MPa and a stirring at 30 rpm. The reaction mixture was allowed to stay for 50 minutes under the same conditions and simultaneously, the condensed water was removed by distillation. The reaction product passed through the initial polymerization step was supplied to reactor SCR conditioned to a reaction temperature of 270° C., 666 hPa (fixed value) and a screw rotation number of 50 rpm, thereby performing the final polymerization. The nitrogen gas (purity: 99.999% or more) purged amount was automatically controlled by the indicated value of the melt viscometer (50). With an average residence time of 10 minutes in SCR, a polyamide resin having an average [RV] value of 2.95 and a standard deviation [σ] of 0.03 was obtained.

Example 17

Powdery adipic acid (ADA) (22.5 kg) and 2.94 kg of powdery 1,4-cyclohexanedicarboxylic acid (CHDA) were supplied to the melting tank (11), and 18 kg of m-xylylenediamine (MXD) was supplied to the melting tank (13). In each of the melting tanks (11) and (13), an operation of keeping a vacuum degree of 40 hPa for 5 minutes and then creating an atmospheric pressure with nitrogen gas was repeated three times. Thereafter, the ADA/CHDA mixture and MXD were heated at 180° C. and 60° C., respectively, under a nitrogen pressure of 0.2 MPa to obtain respective melted liquids. Subsequently, the ADA/CHDA mixed liquid and MXD were transferred to the storage tank (12) and the storage tank (14), respectively.

The melted raw materials, that is, ADA/CHDA mixture and MXD, were supplied by plunger pumps (15) and (16), respectively, to the tubular reaction apparatus (L/D=780) (21) for the amidation step each in a constant amount. At this time, as for the mass flow rates of ADA and CHDA, the outputs of the plunger pumps (15) and (16) were automatically controlled by the control unit (19) so that the mass flowmeters (17) and (18) (both, Model CN003D-SS-200R, Coriolis-type flowmeter, manufactured by Oval Corporation) disposed immediately after the plunger pumps (15) and (16) could indicate the values shown in Table 5, respectively.

The average residence time in the amidation step was 35 minutes. The reaction conditions in the amidation step were such that the inner temperature at the inlet (22) was 180° C., the inner temperature at the outlet (23) was 255° C., and the inner pressure was 0.7 MPa. The shear rate γ at the inlet (22) of the amidation step was 3.1 (1/sec) and the shear stress τ was $9.6 \times 10^{-4}$ Pa. The difference ARV between the relative viscosity [RV] at the inlet (22) of the amidation step and the [RV] at the outlet (23) was 0.22.

The reaction mixture passed through the amidation step was supplied to the vertical stirring tank (31) for the initial polymerization step conditioned to an inner temperature of 255° C., an inner pressure of 0.7 MPa and a stirring at 30 rpm. The reaction mixture was allowed to stay for 50 minutes under the same conditions and simultaneously, the condensed water was removed by distillation. The reaction product passed through the initial polymerization step was supplied to SCR (41) conditioned to a reaction temperature of 255° C., a screw rotation number of 50 rpm and a vacuum degree of 1,000 hPa, and the nitrogen gas (purity: 99.999% or more) purged amount was controlled by the indicated value of the melt viscometer (50). With an average residence time of 10 minutes in SCR, a polyamide resin having an average [RV] value of 2.23 and a standard deviation [σ] of 0.03 was obtained.

The results of Examples 16 and 17 are shown in Table 5.

These Examples are mere examples in all respects and should not be construed as restrictive. Furthermore, all changes and modifications belonging to the equivalent range of the scope of claim for a patent are within the scope of the present invention.

TABLE 5

| | | | | Example 16 | Example 17 |
|---|---|---|---|---|---|
| Production Conditions | Composition of Polyamide | | | 6,6 | SMC |
| | Raw Material Preparation Step | Concentration of oxygen | (ppm) | 4 | 4 |
| | Raw Material Introduction Step | Set value of flow rate | dicarboxylic acid | 5.10 kg/hr | 4.83 kg/hr |
| | | | diamine | 4.06 kg/hr | 4.42 kg/hr |
| | Amidation Step | L/D | (-) | 780 | 780 |
| | | Average residence time | (min) | 35 | 35 |
| | | γ | (1/sec) | 3.10 | 3.10 |
| | | τ | (×10$^{-4}$ Pa) | 9.0 | 9.6 |
| | | ΔRV | (-) | 0.23 | 0.22 |
| | Later Polymerization Step | Nitrogen purged amount | (L/kg) | automatic control | automatic control |
| | | Vacuum degree | (hPa) | 666 | 1000 |
| | | Amount added of HOPA | (meq/kg) | none | none |
| Properties of Polymer | [RV] | Average value | (-) | 2.95 | 2.23 |
| | | Standard deviation | (-) | 0.03 | 0.03 |

6,6: adipic acid//hexamethylenediamine
SMC: adipic acid/1,4-cyclohexanedicarboxylic acid//m-xylylenediamine

The invention claimed is:

1. A continuous production method of a polyamide, comprising continuously producing the polyamide by melt polymerization using a multistage polymerization reaction apparatus,
wherein a self-cleaning horizontal twin-screw reaction apparatus is used as a final polymerization reaction apparatus constituting the multistage polymerization reaction apparatus,
wherein the final polymerization is effected while performing an operation of purging inert gas inside the final polymerization reaction apparatus or while performing two or three operations selected from the group consisting of an operation of purging inert gas inside the final polymerization reaction apparatus, an operation of vacuating the final polymerization reaction apparatus, and an operation of adding an end group adjusting agent into the final polymerization reaction apparatus, and
wherein the melt viscosity of the polyamide is controlled by continuously measuring the melt viscosity of the polyamide at an outlet of the final polymerization reaction apparatus by a viscometer and automatically controlling at least one operation amount selected from the group consisting of the amount of the inert gas purged, the vacuum degree and the amount added of the end group adjusting agent corresponding to said operations so that the measured viscosity value becomes a value within a previously set definite range.

2. The continuous production method of a polyamide as claimed in claim 1, wherein two operations selected from the group consisting of the inert gas purging operation, the vacuum operation and the addition operation of an end group adjusting agent are performed and one operation amount out of two operation amounts is set as a fixed value and the other operation amount is automatically controlled.

3. The continuous production method of a polyamide as claimed in claim 1, wherein all the three operations selected from the group consisting of the inert gas purging operation, the vacuum operation and the addition operation of an end group adjusting agent are performed and two operation amounts out of three operation amounts are each set as a fixed value and only the remaining one operation amount is automatically controlled, or only one operation amount out of three operation amounts is set as a fixed value and the other two operation amounts are automatically controlled.

4. The continuous production method of a polyamide as claimed in claim 1, wherein the inert gas has a moisture percentage of 0.05 wt % or less.

5. The continuous production method of a polyamide as claimed in claim 1, wherein the polyamide comprises an m-xylylenediamine (MXD) as a diamine component, and the m-xylylenediamine (MXD) content is at least 70 mol % based on the diamine component.

6. The continuous production method of a polyamide as claimed in claim 1, wherein a polyamide having a relative viscosity [RV] of 1.6 to 4.0 is obtained.

7. A continuous production method of a polyamide mainly comprising a diamine component unit and a dicarboxylic acid component unit, said method comprising:
   (a) a raw material preparation step of individually melting a diamine and a dicarboxylic acid or forming a salt of amine and carboxylic acid in water,
   (b) a raw material introduction step of continuously introducing the prepared raw material into a tubular reaction apparatus,
   (c) an amidation step of passing the introduced raw material through the tubular reaction apparatus, thereby effecting amidation to obtain a reaction mixture containing an amidated product and condensed water,
   (d) an initial polymerization step of introducing said reaction mixture into a continuous reaction apparatus capable of separation and removal of water, and elevating the polymerization degree while separating and removing water at a temperature higher than the melting point of the finally obtained polyamide to obtain a polyamide prepolymer, and (e) a final polymerization step of introducing the polyamide prepolymer into a continuous reaction apparatus capable of separation and removal of water, and further elevating the polymerization degree at a temperature higher than the melting point of the finally obtained polyamide to obtain a polyamide adjusted to a desired relative viscosity [RV]

wherein in the final polymerization step (e), the final polymerization is effected while performing an operation of purging inert gas inside the reaction apparatus or while performing two or three operations selected from the group consisting of an operation of purging inert gas inside the reaction apparatus, an operation of vacuating the reaction apparatus, and an operation of adding an end group adjusting agent into the reaction apparatus, and wherein the melt viscosity of the polyamide is controlled by continuously measuring the melt viscosity of the polyamide at an outlet of the final polymerization reaction apparatus by a viscometer and automatically controlling at least one operation amount out of the inert gas purged amount, the vacuum degree and the amount added of the end group adjusting agent corresponding to said operations so that the measured viscosity value becomes a value within a previously set definite range.

8. The continuous production method of a polyarnide as claimed in claim 7, wherein the tubular reaction apparatus used for the amidation step (c) has L/D of 50 or more, wherein the inner diameter of the tube is D (mm) and the length of the tube is L (mm).

9. The continuous production method of a polyamide as claimed in claim 7, wherein the average residence time in the amidation step (c) is from 10 to 120 minutes.

10. The continuous production method of a polyamide as claimed in claim 7, wherein the shear rate (γ) in the amidation step (c) is 0.1 (1/see) or more and the shear stress (τ) is $1.5 \times 10^{-5}$ Pa or more.

11. The continuous production method of a polyamide as claimed in claim 7, wherein in the amidation step (c), the relative viscosity [RV] of the reaction mixture is elevated by 0.05 to 0.6.

12. The continuous production method of a polyamide as claimed in claim 7, wherein the average residence time in the initial polymerization step (d) is from 10 to 150 minutes.

13. The continuous production method of a polyamide as claimed in claim 7, wherein the continuous reaction apparatus in the final polymerization step (e) is a horizontal reaction apparatus.

14. The continuous production method of a polyamide as claimed in claim 7, wherein the continuous reaction apparatus in the final polymerization step (e) is a self-cleaning horizontal twin-screw reaction apparatus.

15. The continuous production method of a polyamide as claimed in claim 7, wherein the average residence time in the final polymerization step (e) is from 1 to 30 minutes.

16. The continuous production method of a polyamide as claimed in claim 7, wherein the relative viscosity [RV] of the polyamide obtained in the final polymerization step (e) is from 1.6 to 4.0.

17. The continuous production method of a polyamide as claimed in claim 7, wherein in the final polymerization step (e), the relative viscosity [RV] of the polyamide is controlled by an operation of purging inert gas inside the reaction apparatus, an operation of adjusting vacuum degree in the reaction apparatus, an operation of adding an end group adjusting agent into the reaction apparatus, or a combination thereof.

18. The continuous production method of a polyamide as claimed in claim 7, wherein in the raw material preparation step (a), the atmospheric oxygen concentration at the preparation of raw material is 10 ppm or less.

19. The continuous production method of a polyamide as claimed in claim 7, wherein the polyamide comprises at least one member selected from the group consisting of the following repeating units (I) to (IV) and optionally further comprises the following repeating unit (V):

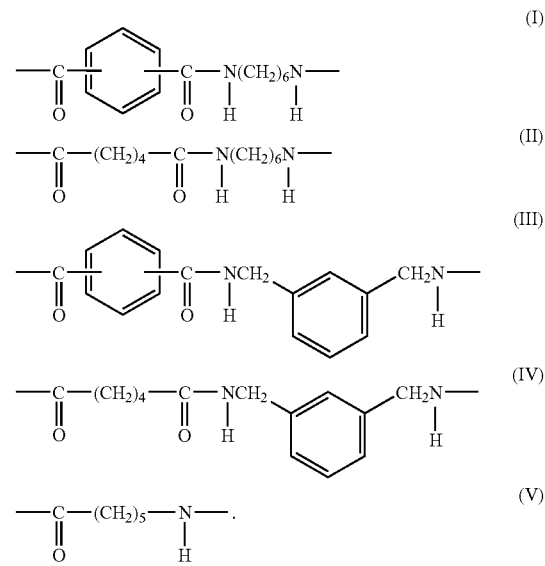

20. The continuous production method of a polyamide as claimed in claim 19, wherein the polyamide comprises at least one member selected from the group consisting of the repeating units (I), (III) and (IV).

21. The continuous production method of a polyamide as claimed in claim 7, wherein the polyamide comprises an m-xylylenediamine (MXD) as a diamine component, and the m-xylyienediamine (MXD) content is at least 70 mol % based on the diamine component.

22. A continuous production method of a polyamide mainly comprising a diamine component unit and a dicarboxylic acid component unit, said method comprising:

(a) a raw material preparation step of individually preparing a melted diamine and a melted dicarboxylic acid, (b) a raw material introduction step of continuously introducing the melted diamine and the melted dicarboxylic acid into a tubular reaction apparatus to get a diamine and a carboxylic acid together by using raw material supply means comprising a raw material supply device, a mass flow rate measuring device provided on the downstream side of said raw material supply device and a control system of automatically controlling the output of said supply device such that the mass flow rate measured by said mass flow rate measuring device becomes a previously set value, (c) an amidation step of passing the diamine and dicarboxylic acid gotten together through the tubular reaction apparatus, thereby effecting amidation to obtain a reaction mixture containing an amidated product and condensed water, (d) an initial polymerization step of introducing said reaction mixture into a continuous reaction apparatus capable of separation and removal of water, and elevating the polymerization degree while separating and removing water at a temperature higher than the melting point of the finally obtained polyamide to obtain a polyamide prepolymer, and (e) a final polymerization step of introducing the polyamide prepolymer into a self-cleaning horizontal twin-screw reaction apparatus capable of separation and removal of water, and further elevating the polymerization degree at a temperature higher than the melting point of the finally obtained polyamide to obtain a polyamide adjusted to a desired relative viscosity [RV]

wherein in the final polymerization step (e), the final polymerization is effected while performing an operation of purging inert gas inside the reaction apparatus or while performing two or three operations selected from the group consisting of an operation of purging inert gas inside the reaction apparatus, an operation of vacuating the reaction apparatus, and an operation of adding an end group adjusting agent into the reaction apparatus, and wherein the melt viscosity of the polyamide is controlled by continuously measuring the melt viscosity of the polyamide at an outlet of the final polymerization reaction apparatus by a viscometer and automatically controlling at least one operation amount out of the inert gas purged amount, the vacuum degree and the amount added of the end group adjusting agent corresponding to said operations so that the measured viscosity value becomes a value within a previously set definite range.

23. The continuous production method of a polyamide as claimed in claim 22, wherein the tubular reaction apparatus used for the amidation step (c) has L/D of 50 or more, wherein the inner diameter of the tube is D (mm) and the length of the tube is L (mm).

24. The continuous production method of a polyamide as claimed in claim 22, wherein the average residence time in the final polymerization step (e) is from 1 to 30 minutes.

25. The continuous production method of a polyamide as claimed in claim 22, wherein the relative viscosity [RV] of the polyamide obtained in the final polymerization step (e) is from 1.6 to 4.0.

26. The continuous production method of a polyamide as claimed in claim 22, wherein in the final polymerization step (e), the relative viscosity [RV] of the polyamide is controlled by an operation of purging inert gas inside the reaction apparatus, an operation of adjusting vacuum degree in the reaction apparatus, an operation of adding an end group adjusting agent into the reaction apparatus, or a combination thereof.

27. The continuous production method of a polyamide as claimed in claim 22, wherein in the raw material preparation step (a), the atmospheric oxygen concentration at the preparation of raw material is 10 ppm or less.

28. The continuous production method of a polyamide as claimed in claim 22, wherein the polyamide comprises an m-xylylenediamine (MXD) as a diamine component, and the m-xylylenediamine (MXD) content is at least 70 mol % based on the diamine component.

29. The continuous production method of a polyamide as claimed in claim 22, wherein the relative viscosity [RV] of the polyamide obtained in the final polymerization step (e) is from 1.6 to 4.0.

* * * * *